United States Patent [19]
Sekiya et al.

[11] Patent Number: 5,828,498
[45] Date of Patent: Oct. 27, 1998

[54] OBJECTIVE LENS OF ENDOSCOPE

[75] Inventors: Takaomi Sekiya; Kazuyuki Takahashi; Masaru Eguchi, all of Tokyo, Japan

[73] Assignee: Asahi Kogaku Kogyo Kabushiki Kaisha, Tokyo, Japan

[21] Appl. No.: 967,212

[22] Filed: Oct. 29, 1997

Related U.S. Application Data

[63] Continuation of Ser. No. 547,339, Oct. 24, 1995, abandoned.

[30] Foreign Application Priority Data

Oct. 25, 1994 [JP] Japan .................................. 6-260702
Nov. 17, 1994 [JP] Japan .................................. 6-283811

[51] Int. Cl.$^6$ ............................. G02B 21/02; G02B 3/02; G02B 9/04
[52] U.S. Cl. ......................... 359/660; 359/717; 359/784; 359/793
[58] Field of Search .................................. 359/717, 793, 359/784, 660, 656–659

[56] References Cited

U.S. PATENT DOCUMENTS

| | | |
|---|---|---|
| Re. 33,689 | 9/1991 | Nishioka .................................. 359/708 |
| 4,662,725 | 5/1987 | Nisioka . |
| 4,674,844 | 6/1987 | Nishioka et al. . |
| 4,806,001 | 2/1989 | Okabe et al. . |
| 4,867,546 | 9/1989 | Nishioka et al. . |
| 4,874,220 | 10/1989 | Yamagata . |
| 4,979,808 | 12/1990 | Yamagata et al. . |
| 5,005,957 | 4/1991 | Kanamori .................................. 359/708 |
| 5,083,223 | 1/1992 | Igarashi . |
| 5,087,989 | 2/1992 | Igarashi . |
| 5,162,945 | 11/1992 | Matsuo et al. . |
| 5,175,650 | 12/1992 | Takayama .................................. 359/716 |
| 5,198,931 | 3/1993 | Igarashi . |
| 5,208,702 | 5/1993 | Shiraiwa . |
| 5,223,982 | 6/1993 | Suzuki et al. . |
| 5,233,473 | 8/1993 | Kanamori . |
| 5,251,073 | 10/1993 | Schauss .................................. 359/715 |

FOREIGN PATENT DOCUMENTS 61-162021  7/1986  Japan .

*Primary Examiner*—David C. Nelms
*Assistant Examiner*—Evelyn A. Lester
*Attorney, Agent, or Firm*—Greenblum & Bernstein, P.L.C.

[57] ABSTRACT

An objective lens for an endoscope includes a front lens of negative power, an aperture stop, and a rear lens group of positive power in this order from the object side. At least one surface of the front lens group and/or the rear lens group is a compound aspherical lens made of a glass lens and a transparent layer applied to the glass lens surface. A surface of the transparent layer farther from the glass lens is an aspherical surface. The refractive index n of the glass lens to which the transparent layer is applied is more than 1.65 (n>1.65).

22 Claims, 33 Drawing Sheets

OBJECTIVE LENS OF ENDOSCOPE

This application is a continuation of application Ser. No. 08/547,339, filed Oct. 24, 1995, now abandoned.

BACKGROUND OF THE INVENTION

1. Field of the Invention

The present invention relates to an objective lens for an endoscope or a rigid endoscope.

2. Description of Related Art

In general, an endoscope or a rigid endoscope has a wide angle of view from 90° to 120°. Consequently, distortion caused in the objective lens tends to become large. Generally speaking, the distortion is approximately −36% or −50% when the angle of view is 100° or 120°, respectively. To reduce this distortion, it is known to use an aspherical lens, as disclosed for example, in Japanese Unexamined Patent Publication No. 61-162021.

However, since the diameter of an objective lens for an endoscope must be as small as possible, it is more difficult to treat or polish the aspherical surface, than in a lens for a 35 mm camera. Moreover, in general such a small aspherical lens is produced by a glass molding process which is, however, only applicable to a glass material whose transition temperature is relatively low and which can be easily made soft. An endoscope or rigid endoscope needs a fast objective lens, due to the low quantity of illuminating light used in a human body.

However, a fast objective lens tends to be large in diameter and long in length. In view of this, it is possible to make each lens element of a glass material having a high refractive index, to increase the power thereof, to thereby reduce the number of lens elements. Thus, a short and small diameter objective lens having a wide angle of view can be produced. However, many glass materials having a high refractive index have a high transition temperature, and accordingly, the glass molding process is not suitable. Nevertheless, if the glass molding process is applied, the amount of heat necessary to melt the glass is increased, and hence, energy consumption is increased. This results in an increased time for heating and annealing, the service life of molding dies is shortened, and production costs are increased. In addition, the degree of freedom of design of an objective lens made of a glass which can be easily molded is restricted, and it is difficult to obtain a desired optical performance.

Usually in an objective lens for an endoscope, the power mainly relies upon a front lens group located closer to an object to be observed than an aperture-stop. If a front lens group is eliminated, the overall length of the lens can be reduced. However, if there is no front lens group, the power of the rear lens group must be increased accordingly. This leads to a deterioration in optical performance, for example distortions occur. In order to increase the power of the rear lens group, it is necessary to increase the refractive index thereof. An aspherical lens can advantageously be used to effectively compensate aberrations.

However, glass materials having a high refractive index which can be easily molded to form an aspherical surface are limited, as has already been mentioned above. Consequently, it is difficult to produce an aspherical lens by the molding process with a glass having a high refractive index. Therefore, in practice, it is very difficult to produce a short objective lens for an endoscope, in which little or no distortion occurs.

SUMMARY OF THE INVENTION

It is an object of the present invention to provide a short and simple objective lens for an endoscope, which can be easily produced, has little or no distortion and includes fewer lens elements than conventional objective lenses for endoscopes.

In the basic concept of the present invention, the main lens power is made mainly of a glass and includes an aspherical surface layer made of transparent resin, or the like, which can be easily machined or processed and applied to the glass to form a compound aspherical lens.

According to one aspect of the present invention, there is provided an objective lens for an endoscope comprising a front lens group of negative power, an aperture stop, and a rear lens group of positive power in this order from the object side, wherein at least one lens of one of the front lens group or rear lens group is a compound aspherical lens made of a glass lens having a transparent layer applied to a surface of the glass lens, a surface of the transparent layer farthest from the glass lens being an aspherical surface, and the refractive index n of the glass lens to which the transparent layer is applied is more than 1.65 (n>1.65).

According to another aspect of the present invention, there is provided an objective lens for an endoscope comprising: a front lens group of negative power; an aperture stop; and, a rear lens group of positive power in this order from the object side; wherein at least one lens of each of the front and rear lens groups is a compound aspherical lens made of a glass lens and a transparent layer applied to a surface of the glass lens, a surface of the transparent layer farthest from the glass lens being an aspherical surface, and the refractive index n of the glass lens to which the transparent layer is applied is more than 1.65 (n>1.65).

In the arrangements mentioned above, the front lens group of negative power is provided on the object side of the diaphragm (stop) and the rear lens group of positive power is provided on the image side of the diaphragm.

Consequently, a wide angle of view can be easily obtained with fewer lenses (lens elements).

Moreover, the degree of freedom to select the number of lens surfaces, to which the aspherical surfaces can be applied to correct distortion, is increased, and hence, distortion can be appropriately compensated, taking into account the balance with other aberrations.

According to a modification of the present invention, there is provided an objective lens for an endoscope comprising: a glass cover; an aperture stop; and, a rear lens group of positive power in this order from the object side; wherein at least one lens of the rear lens group is a compound aspherical lens made of a glass lens and a transparent layer applied to a surface of the glass lens, a surface of the transparent layer farthest from the glass lens being an aspherical surface, and the refractive index n of the glass lens of the compound aspherical lens being more than 1.65 (n>1.65).

According to another aspect of the present invention, there is provided an objective lens for an endoscope comprising: an aperture stop; and, a rear lens group of positive power in this order from the object side; wherein at least one lens of said rear lens group is a compound aspherical lens made of a glass lens and a transparent layer applied to a surface of the glass lens, a surface of the transparent layer farthest from the glass lens being an aspherical surface, and the refractive index n of the glass lens of the compound aspherical lens being more than 1.65 (n>1.65).

According to the present invention, the lens is comprised of an aperture stop and a rear lens group of positive power in this order from the object side, with an absence of a front lens group, wherein at least one lens of the rear lens group is made of a compound aspherical lens comprised of a glass lens and a transparent member applied to the surface of the glass lens; the surface of the transparent member that is not adhered to the glass lens is an aspherical surface; and, the glass lens of the compound aspherical lens is made of a glass material having a refractive index n of more than 1.65 (n>1.65).

Thus, a short and small diameter objective lens for an endoscope can be provided.

In addition, according to the present invention, the aspherical surface effectively reduces various aberrations including spherical aberration, axial chromatic aberration, lateral chromatic aberration, astigmatism, and distortion.

The present disclosure relates to subject matter contained in Japanese patent application Nos. 06-260702 (filed on Oct. 25, 1994) and 06-283811 (filed on Nov. 17, 1994) which are expressly incorporated herein by reference in their entireties.

BRIEF DESCRIPTION OF THE DRAWINGS

The present invention will be discussed below in detail with reference to the accompanying drawings, in which.

DESCRIPTION OF THE PREFERRED EMBODIMENT

Figure 1:
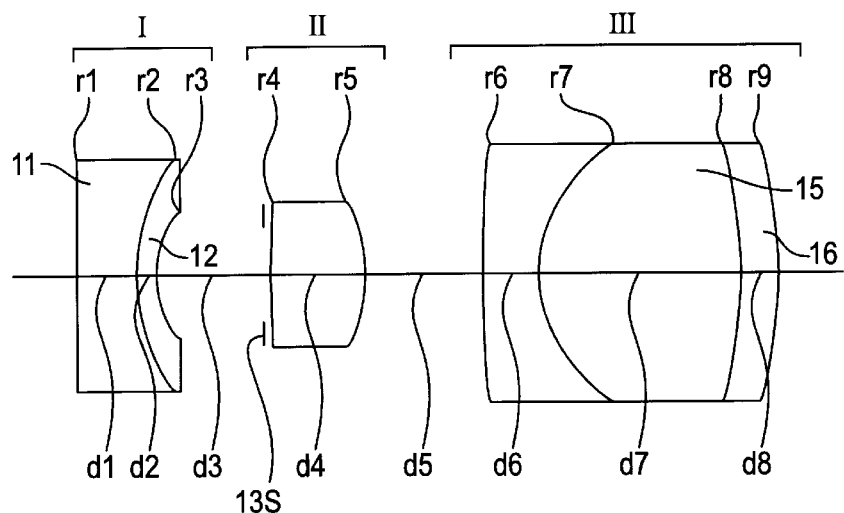
FIG. 1 is a schematic view showing a lens arrangement of an objective lens for an endoscope according to a first embodiment of the present invention.
Figure 2:
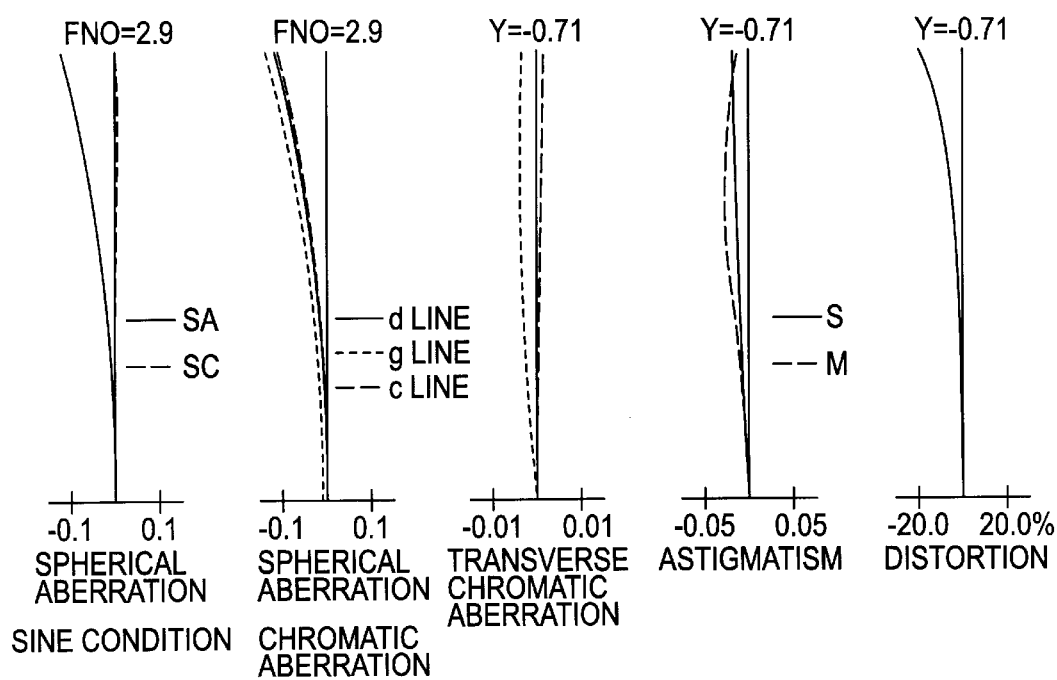
FIG. 2 shows diagrams of various aberrations of the objective lens shown in FIG. 1.
Figure 3:
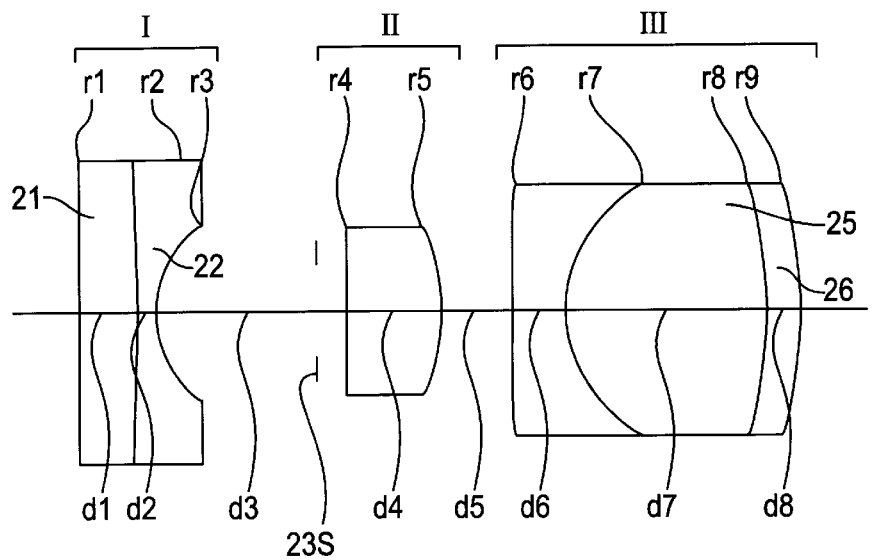
FIG. 3 is a schematic view showing a lens arrangement of an objective lens for an endoscope according to a second embodiment of the present invention.
Figure 4:
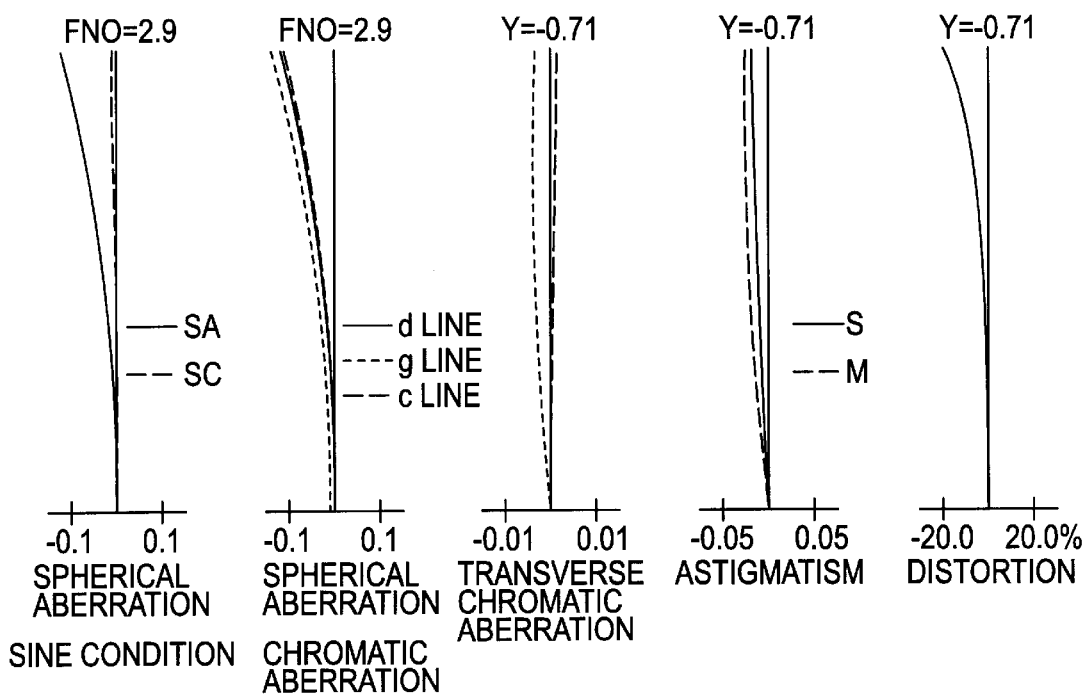
FIG. 4 shows diagrams of various aberrations of the objective lens shown in FIG. 3.
Figure 5:
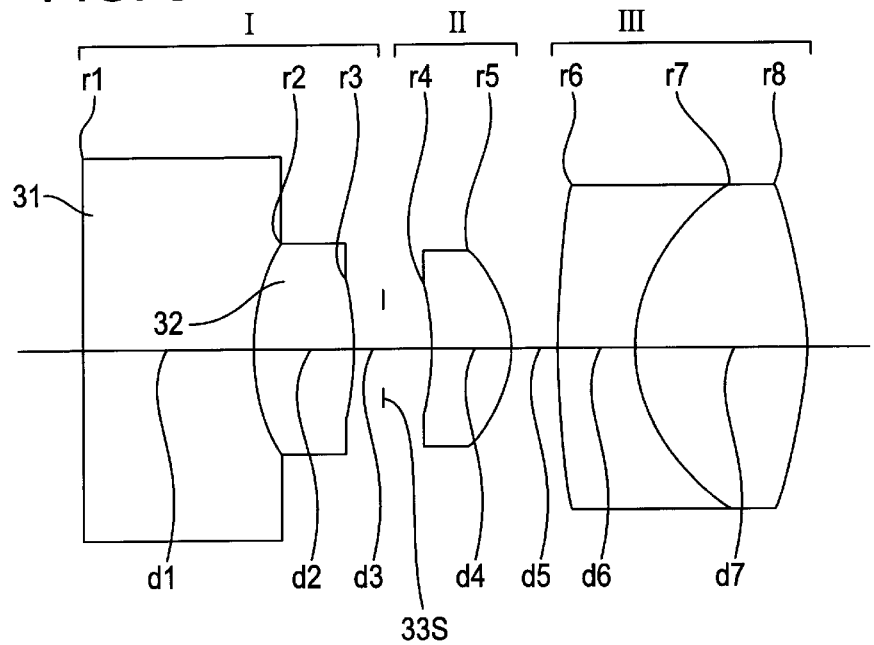
FIG. 5 is a schematic view showing a lens arrangement of an objective lens for an endoscope according to a third embodiment of the present invention.
Figure 6:
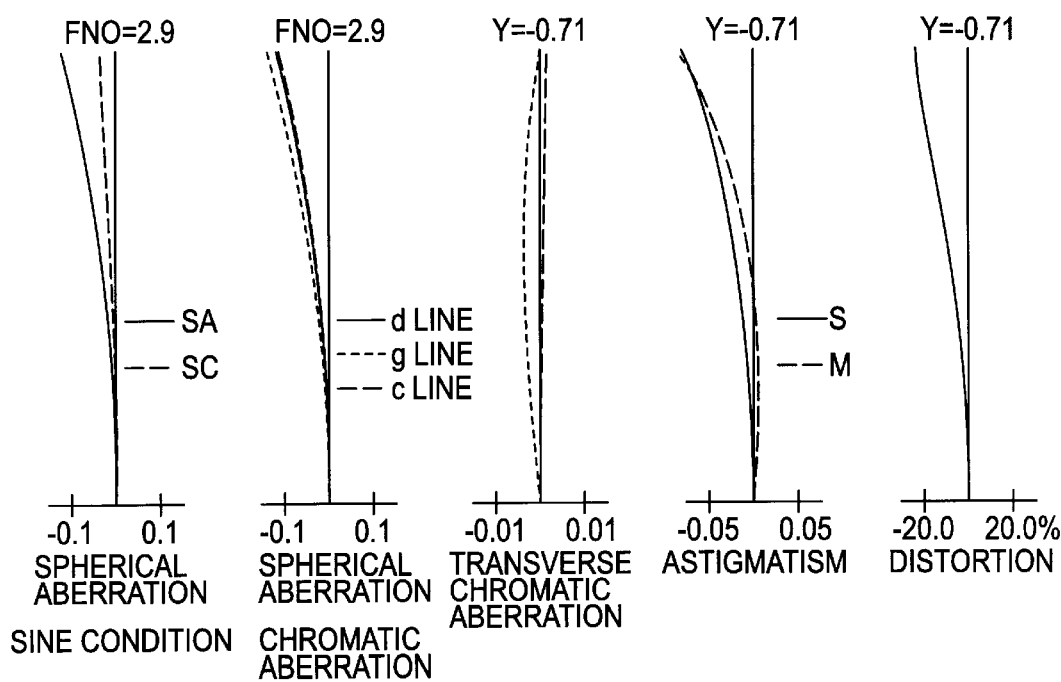
FIG. 6 shows diagrams of various aberrations of the objective lens shown in FIG. 5.
Figure 7:
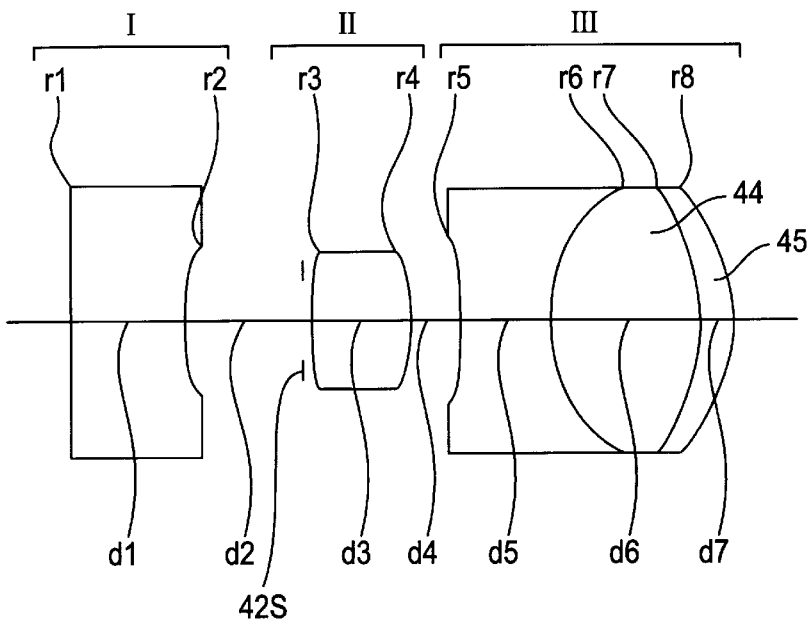
FIG. 7 is a schematic view showing a lens arrangement of an objective lens for an endoscope according to a fourth embodiment of the present invention.
Figure 8:
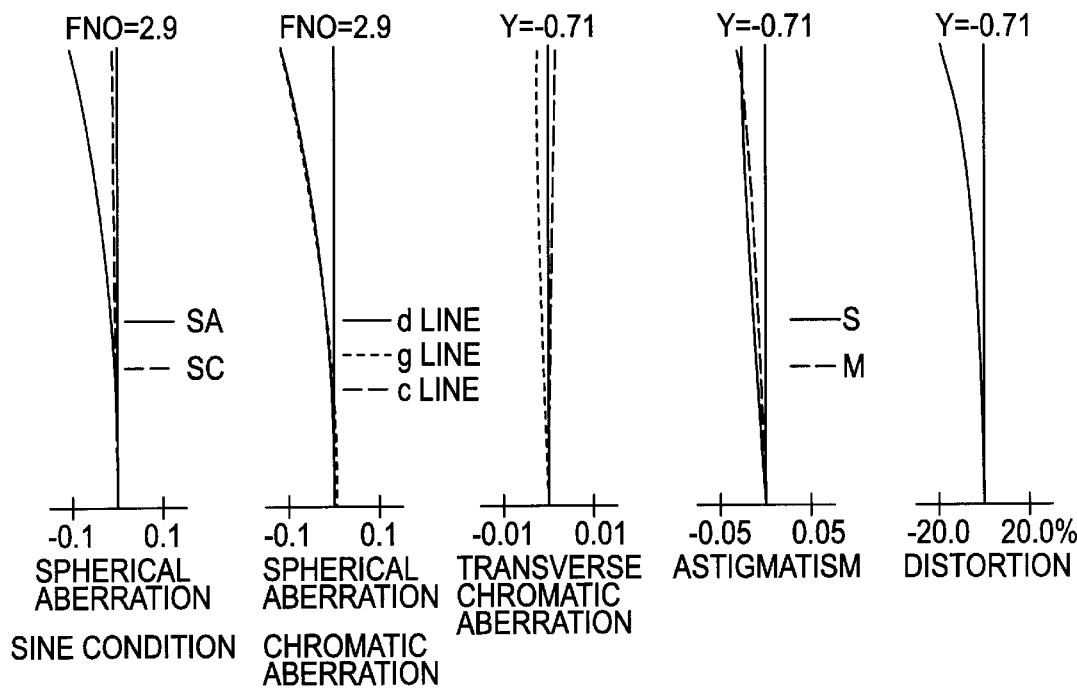
FIG. 8 shows diagrams of various aberrations of the objective lens shown in FIG. 7.
Figure 9:
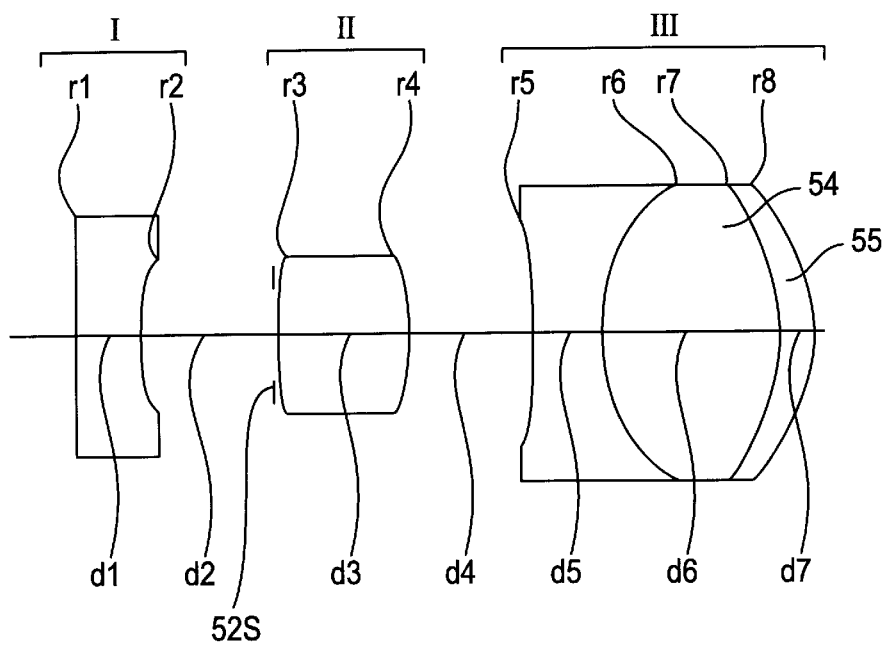
FIG. 9 is a schematic view showing a lens arrangement of an objective lens for an endoscope according to a fifth embodiment of the present invention.
Figure 10:
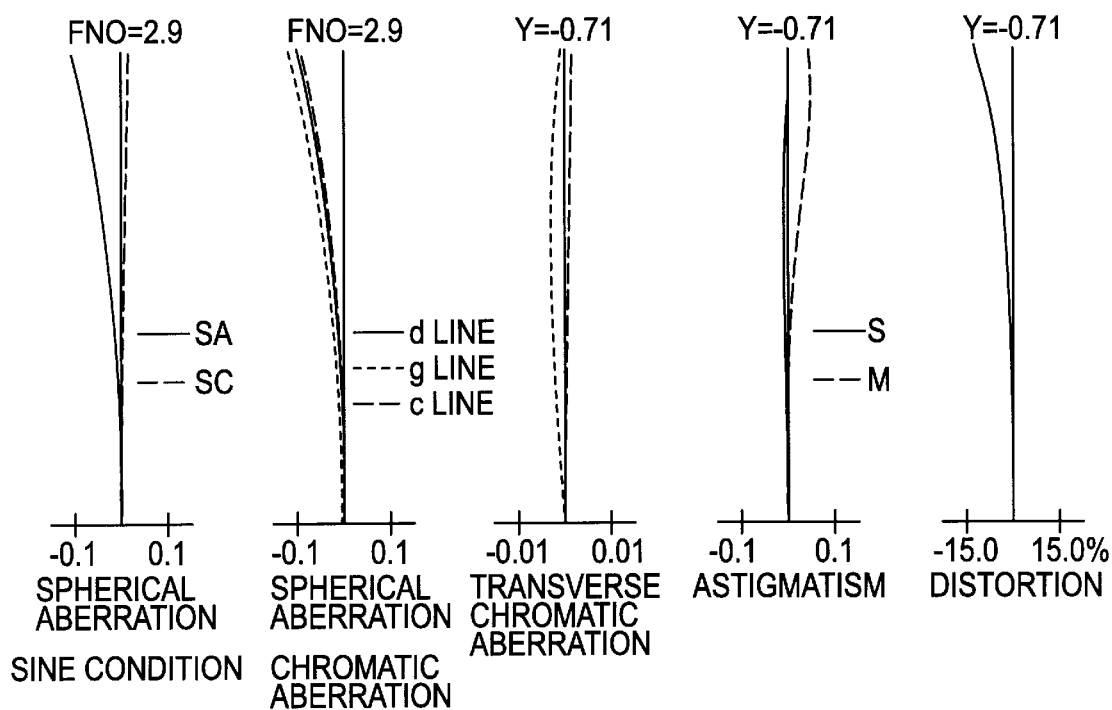
FIG. 10 shows diagrams of various aberrations of the objective lens shown in FIG. 9.
Figure 11:
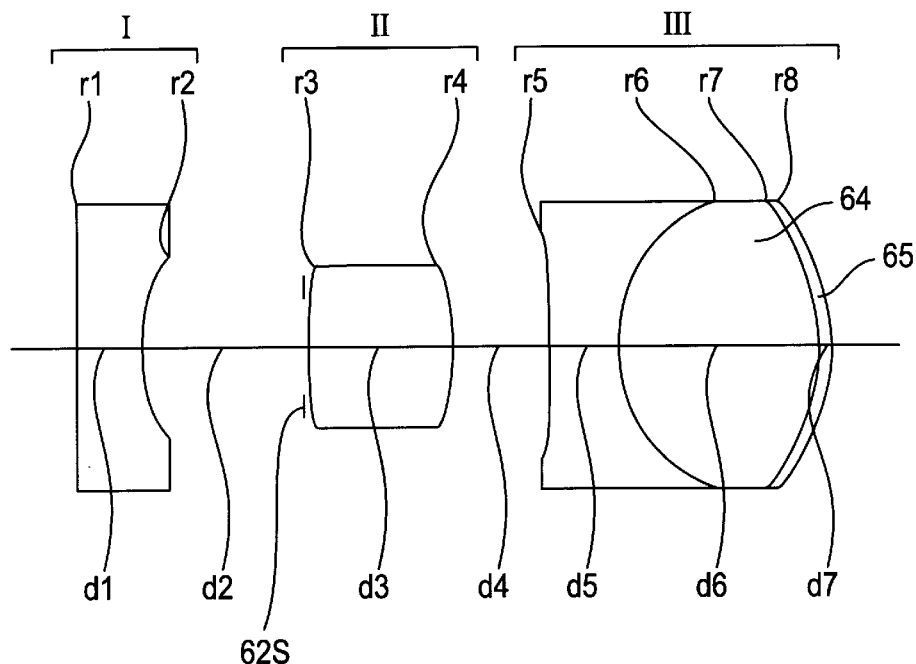
FIG. 11 is a schematic view showing a lens arrangement of an objective lens for an endoscope according to a sixth embodiment of the present invention.
Figure 12:
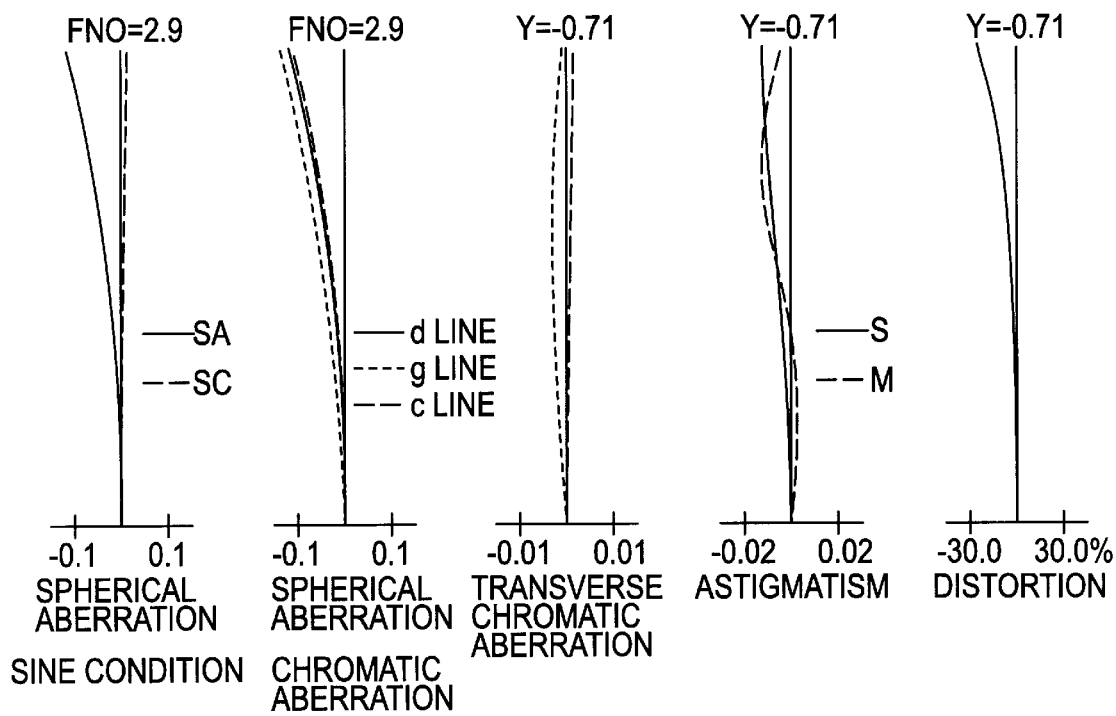
FIG. 12 shows diagrams of various aberrations of the objective lens shown in FIG. 11.
Figure 13:
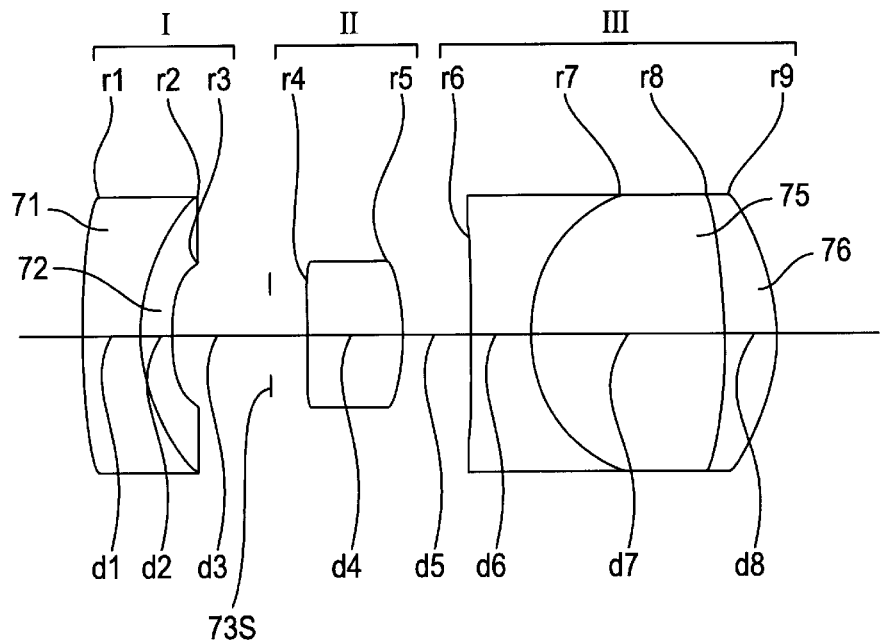
FIG. 13 is a schematic view showing a lens arrangement of an objective lens for an endoscope according to a seventh embodiment of the present invention.
Figure 14:
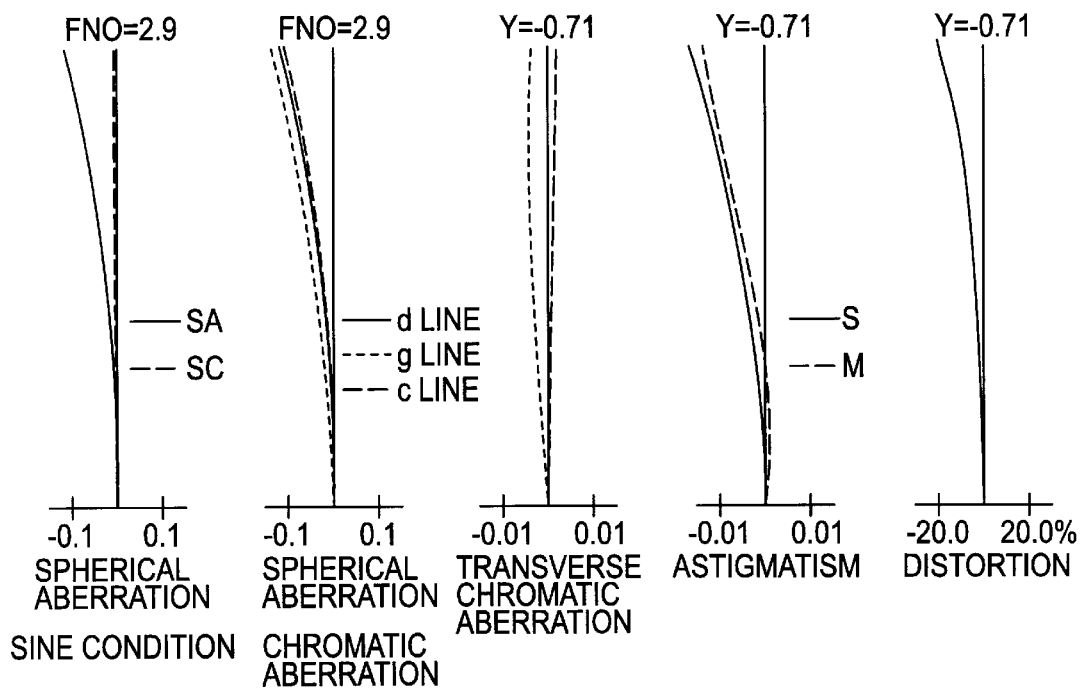
FIG. 14 shows diagrams of various aberrations of the objective lens shown in FIG. 13.
Figure 15:
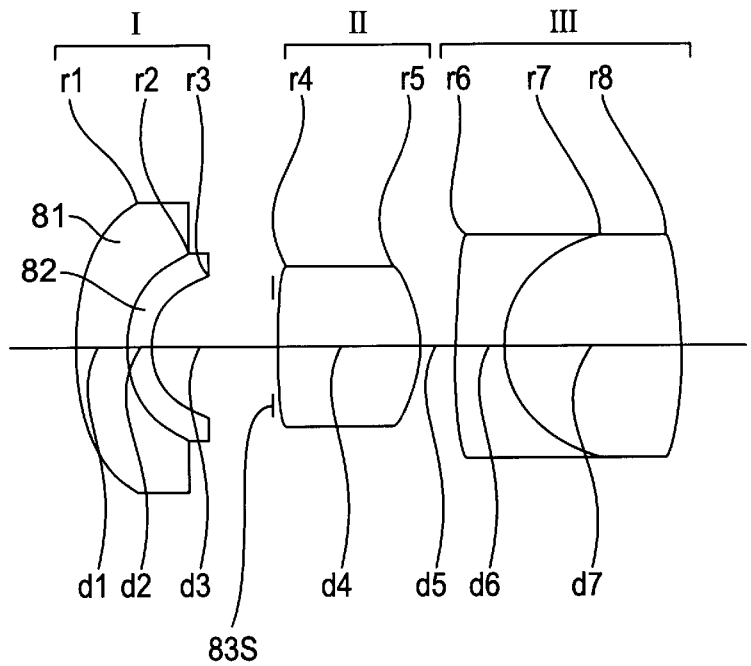
FIG. 15 is a schematic view showing a lens arrangement of an objective lens for an endoscope according to an eighth embodiment of the present invention.
Figure 16:
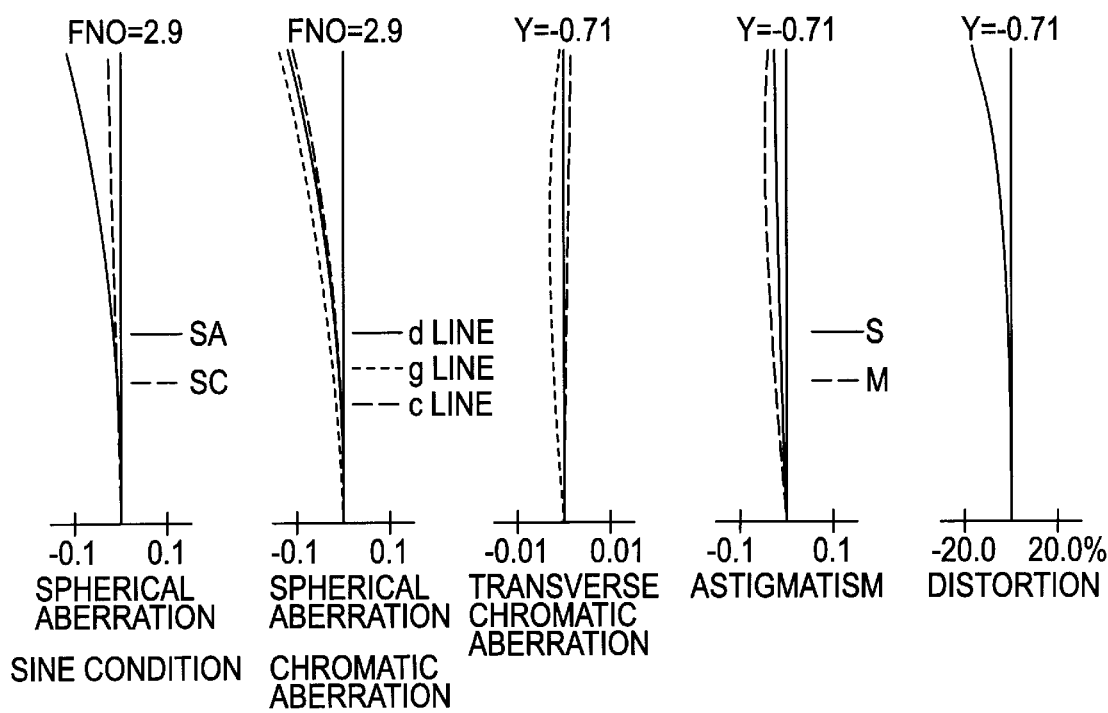
FIG. 16 shows diagrams of various aberrations of the objective lens shown in FIG. 15.
Figure 17:
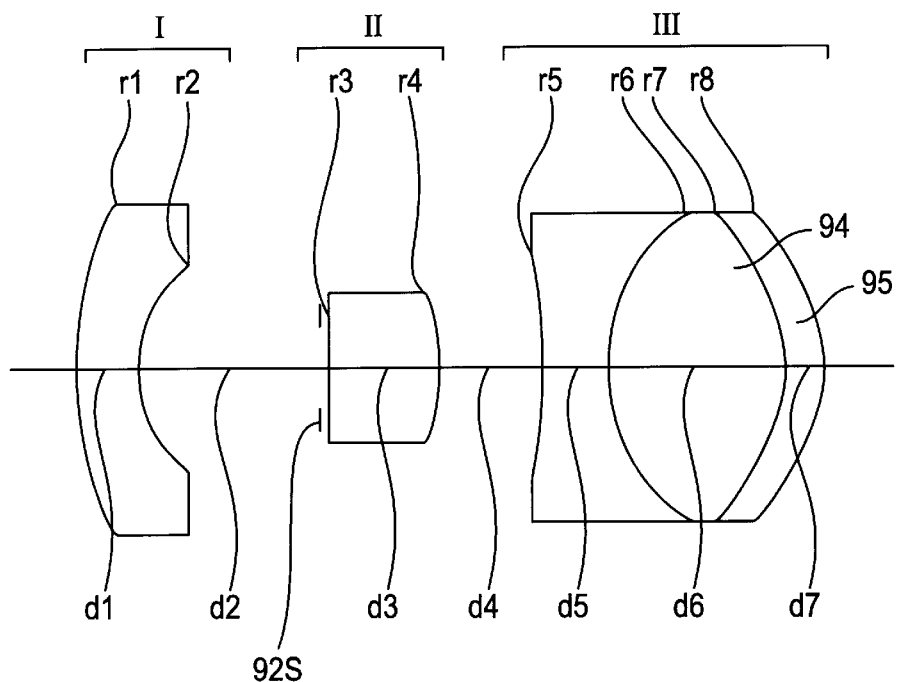
FIG. 17 is a schematic view showing a lens arrangement of an objective lens for an endoscope according to a ninth embodiment of the present invention.
Figure 18:
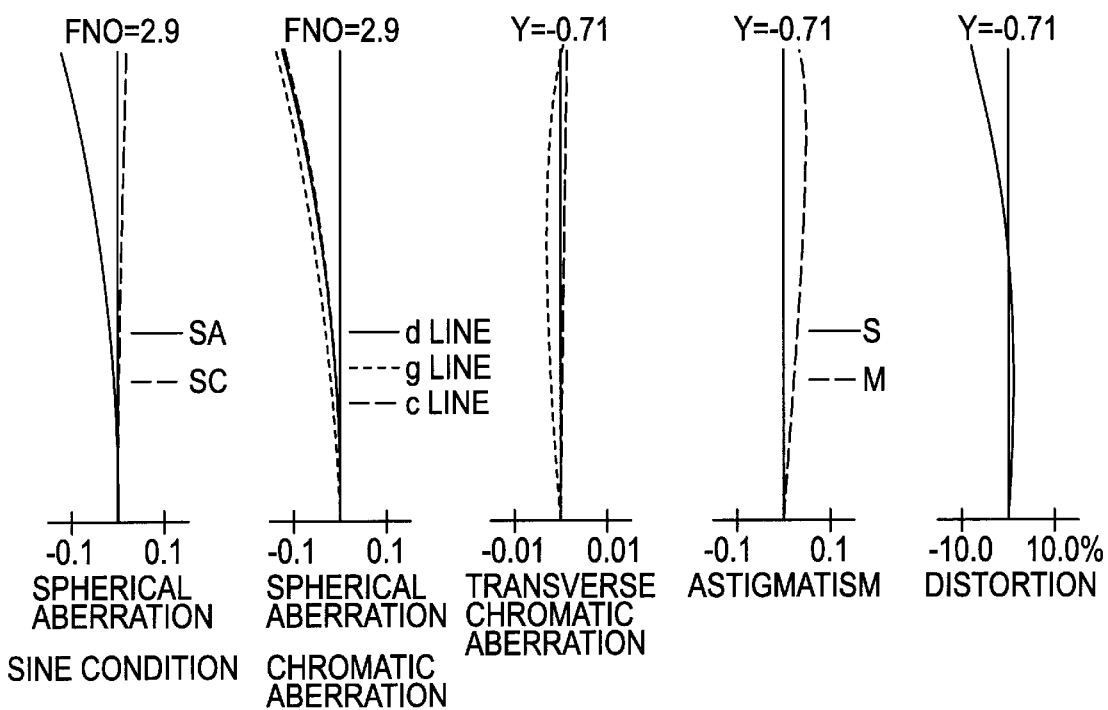
FIG. 18 shows diagrams of various aberrations of the objective lens shown in FIG. 17.
Figure 19:
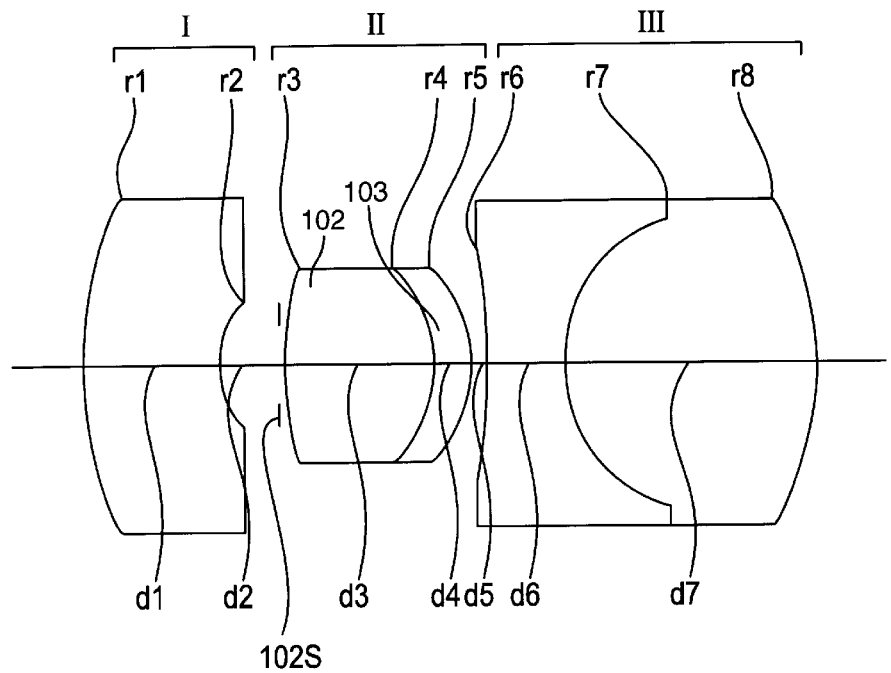
FIG. 19 is a schematic view showing a lens arrangement of an objective lens for an endoscope according to a tenth embodiment of the present invention.
Figure 20:
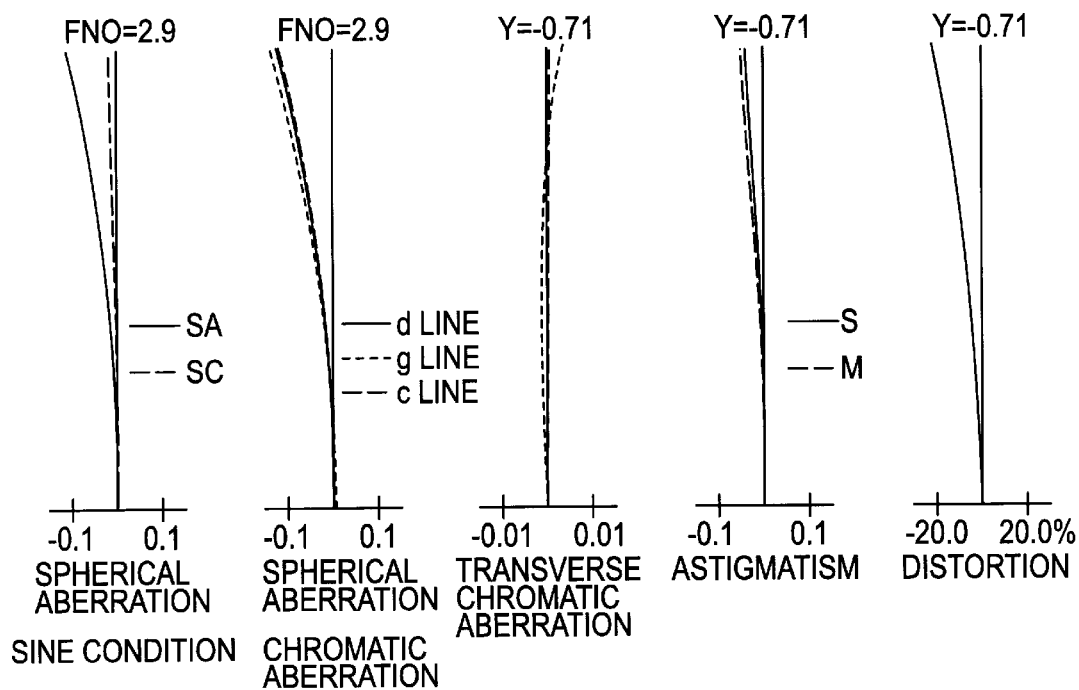
FIG. 20 shows diagrams of various aberrations of the objective lens shown in FIG. 19.
Figure 21:
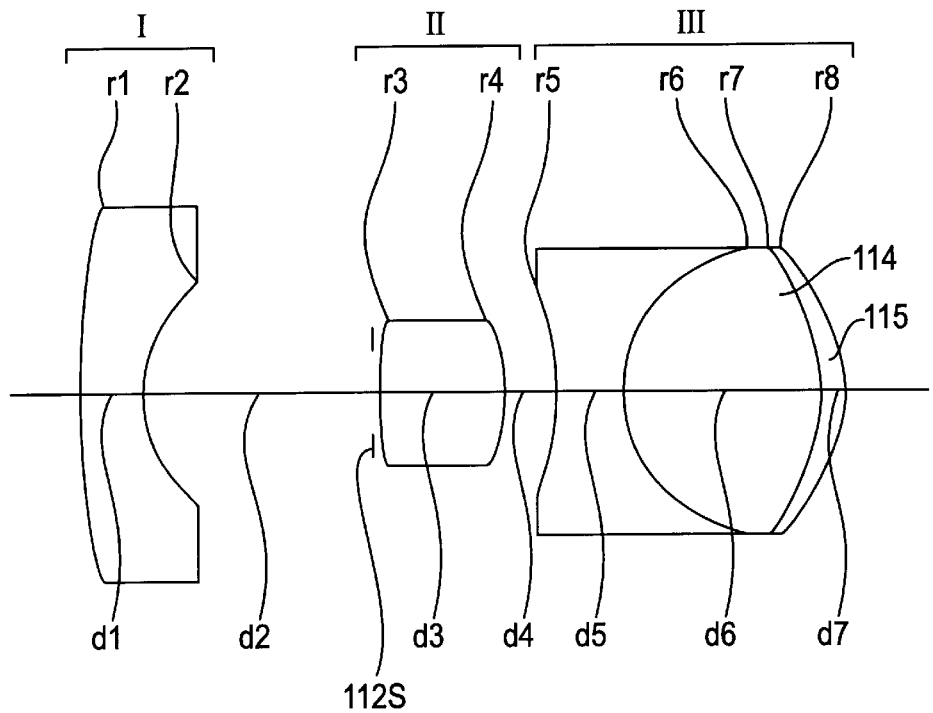
FIG. 21 is a schematic view showing a lens arrangement of an objective lens for an endoscope according to an eleventh embodiment of the present invention.
Figure 22:
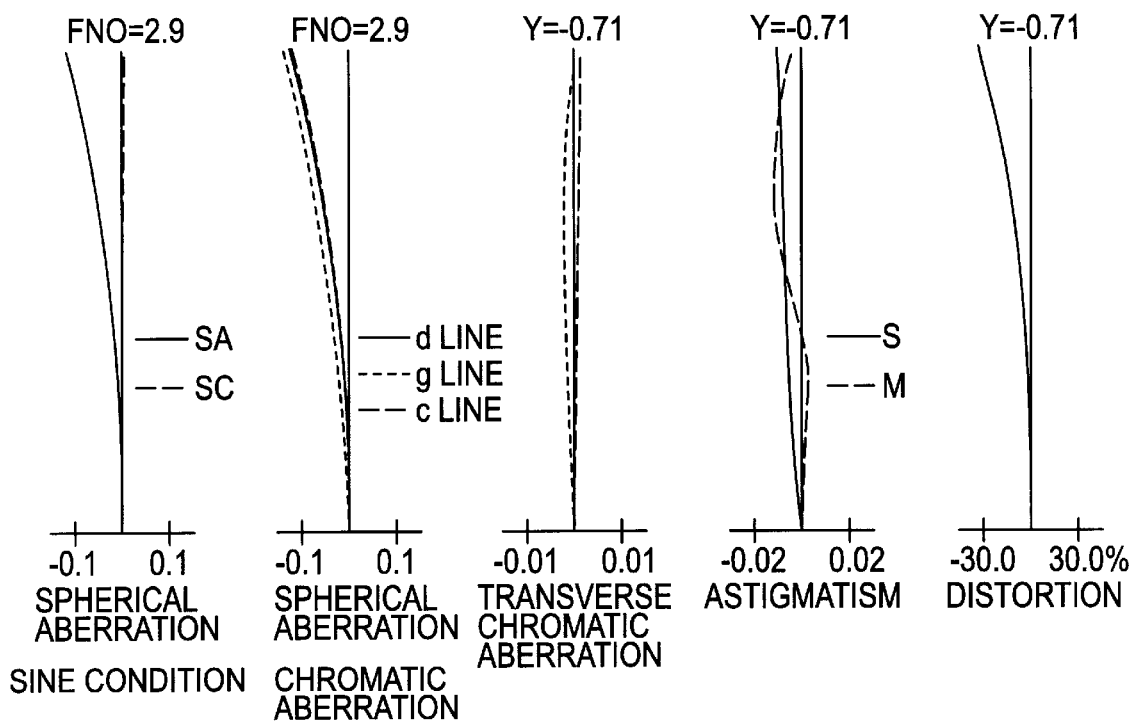
FIG. 22 shows diagrams of various aberrations of the objective lens shown in FIG. 21.
Figure 23:
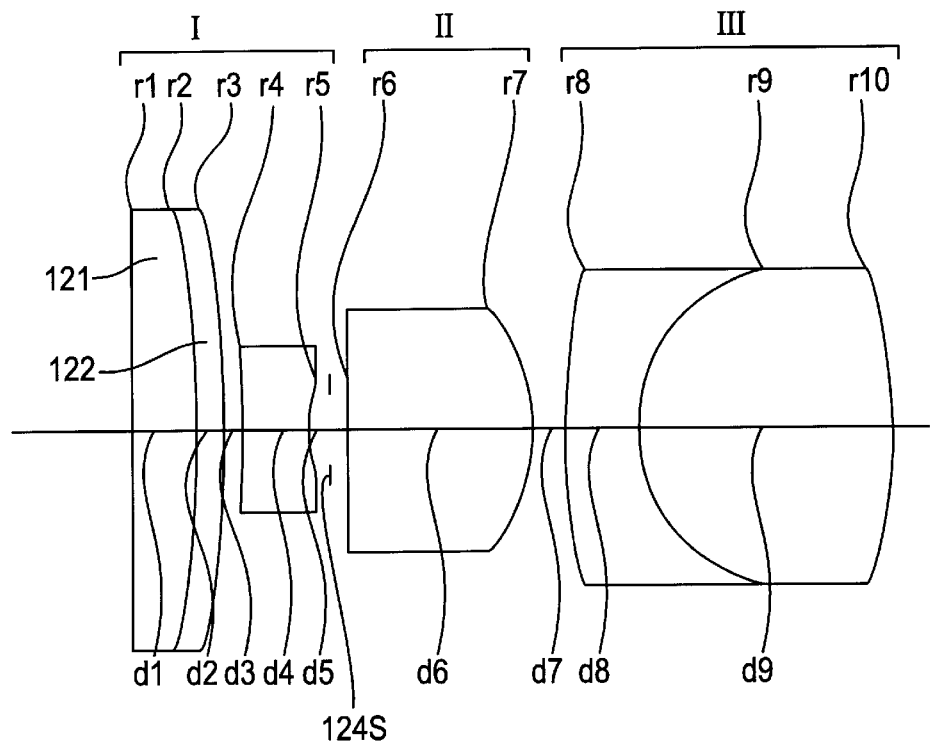
FIG. 23 is a schematic view showing a lens arrangement of an objective lens for an endoscope according to a twelfth embodiment of the present invention.
Figure 24:
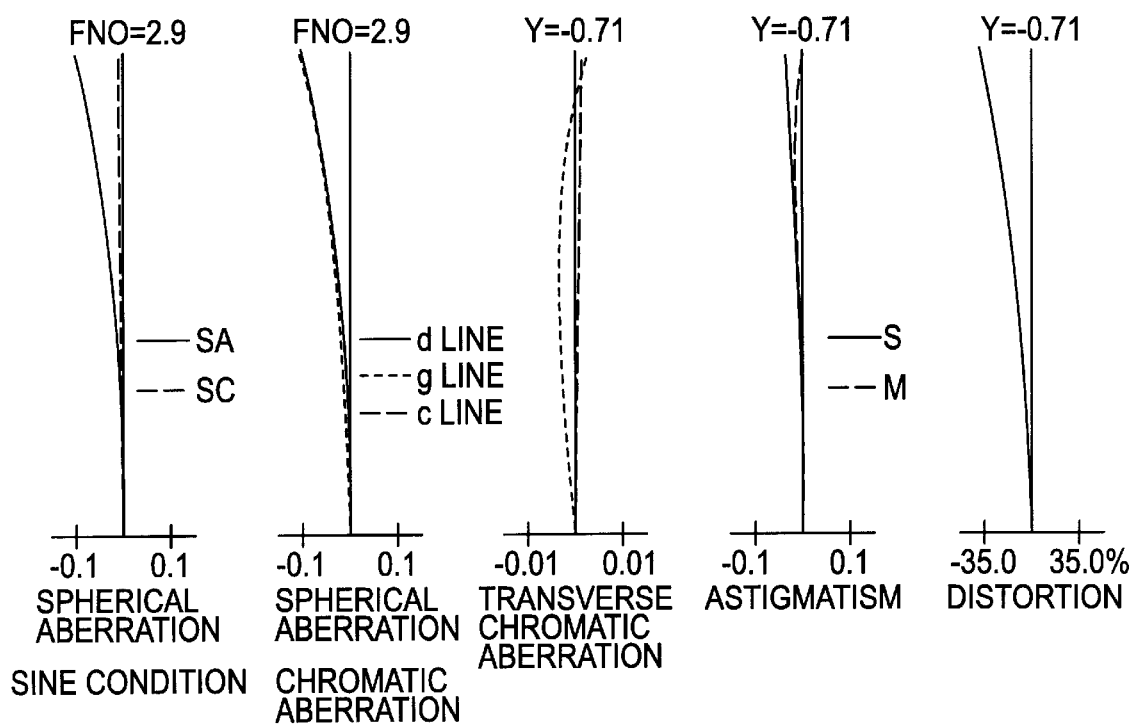
FIG. 24 shows diagrams of various aberrations of the objective lens shown in FIG. 23.
Figure 25:
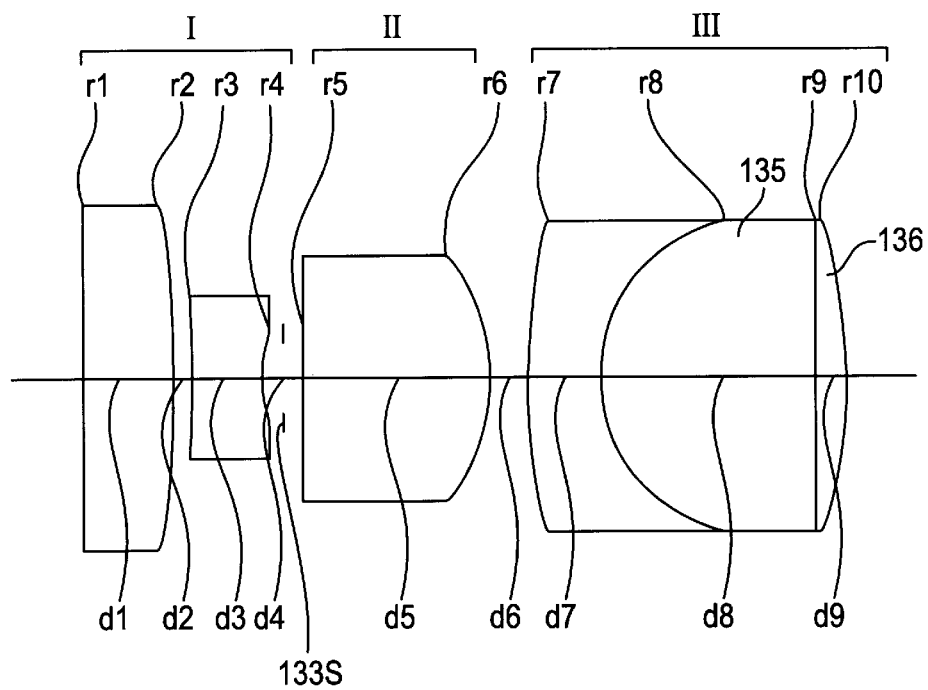
FIG. 25 is a schematic view showing a lens arrangement of an objective lens for an endoscope according to a thirteenth embodiment of the present invention.
Figure 26:
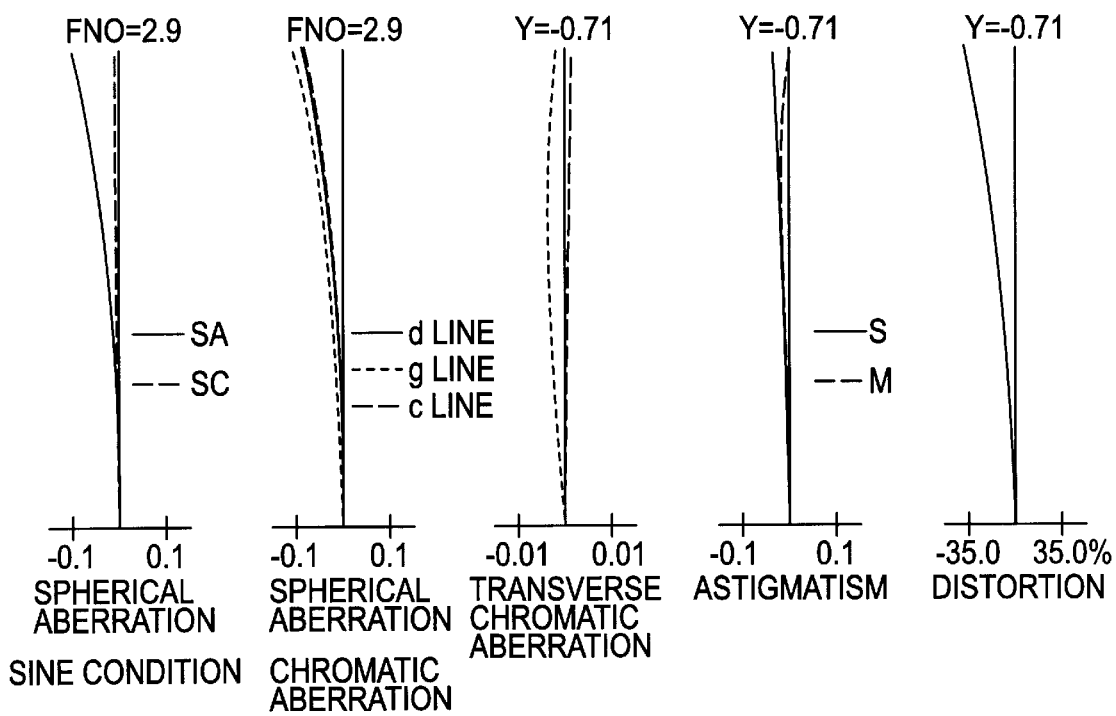
FIG. 26 shows diagrams of various aberrations of the objective lens shown in FIG. 25.
Figure 27:
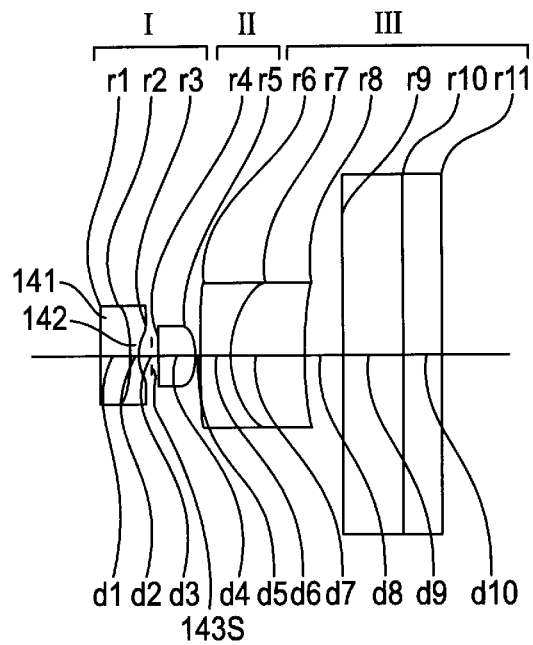
FIG. 27 is a schematic view showing a lens arrangement of an objective lens for an endoscope according to a fourteenth embodiment of the present invention.
Figure 28:
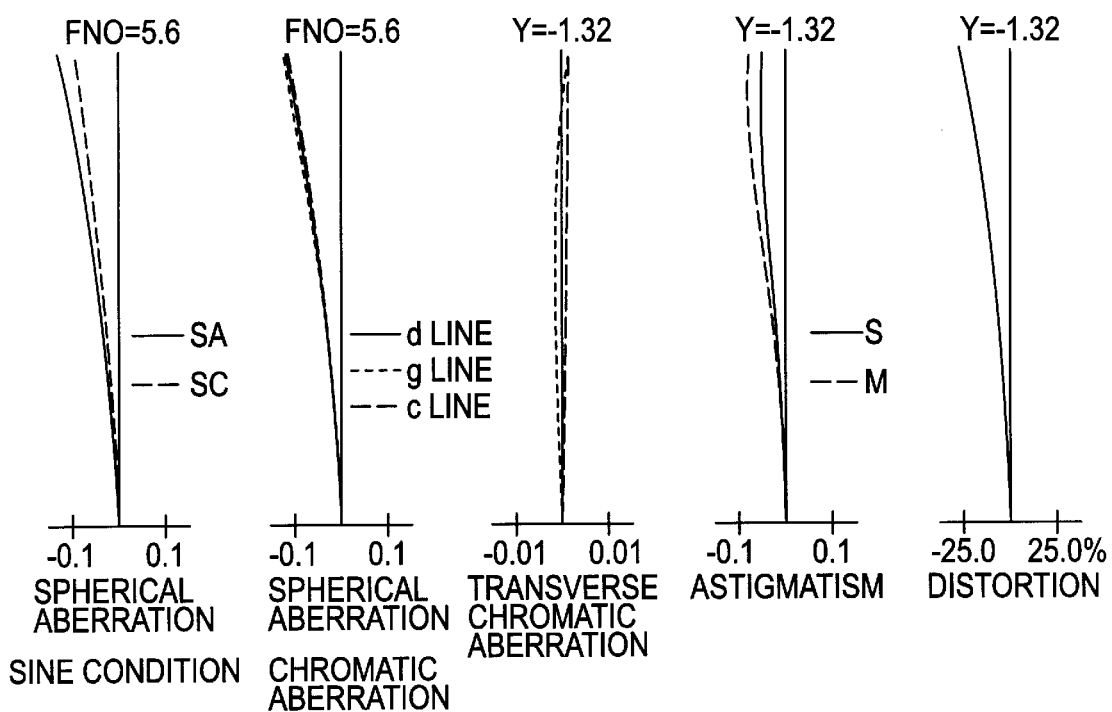
FIG. 28 shows diagrams of various aberrations of the objective lens shown in FIG. 27.
Figure 29:
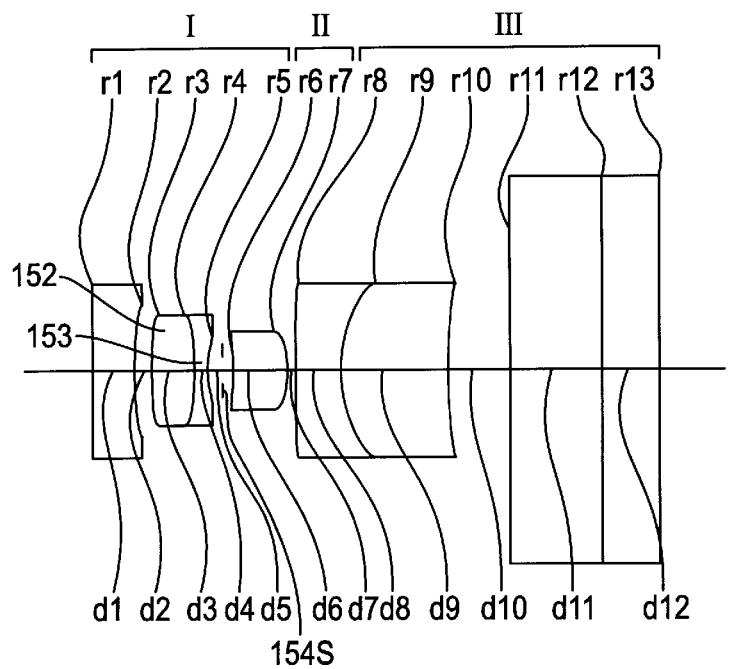
FIG. 29 is a schematic view showing a lens arrangement of an objective lens of an endoscope according to a fifteenth embodiment of the present invention.
Figure 30:
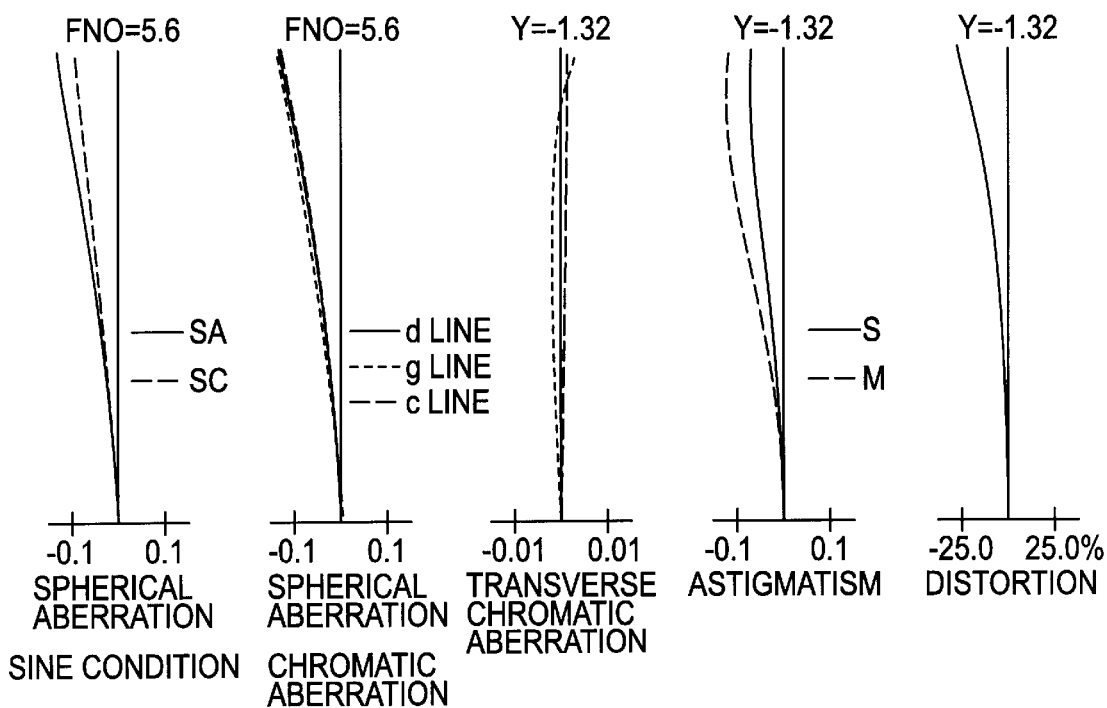
FIG. 30 shows diagrams of various aberrations of the objective lens shown in FIG. 29.
Figure 31:
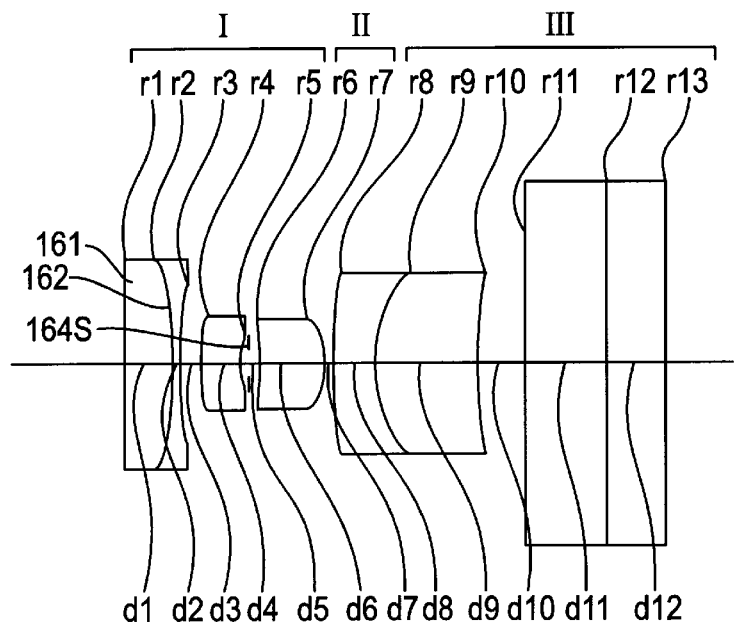
FIG. 31 is a schematic view showing a lens arrangement of an objective lens for an endoscope according to a sixteenth embodiment of the present invention.
Figure 32:
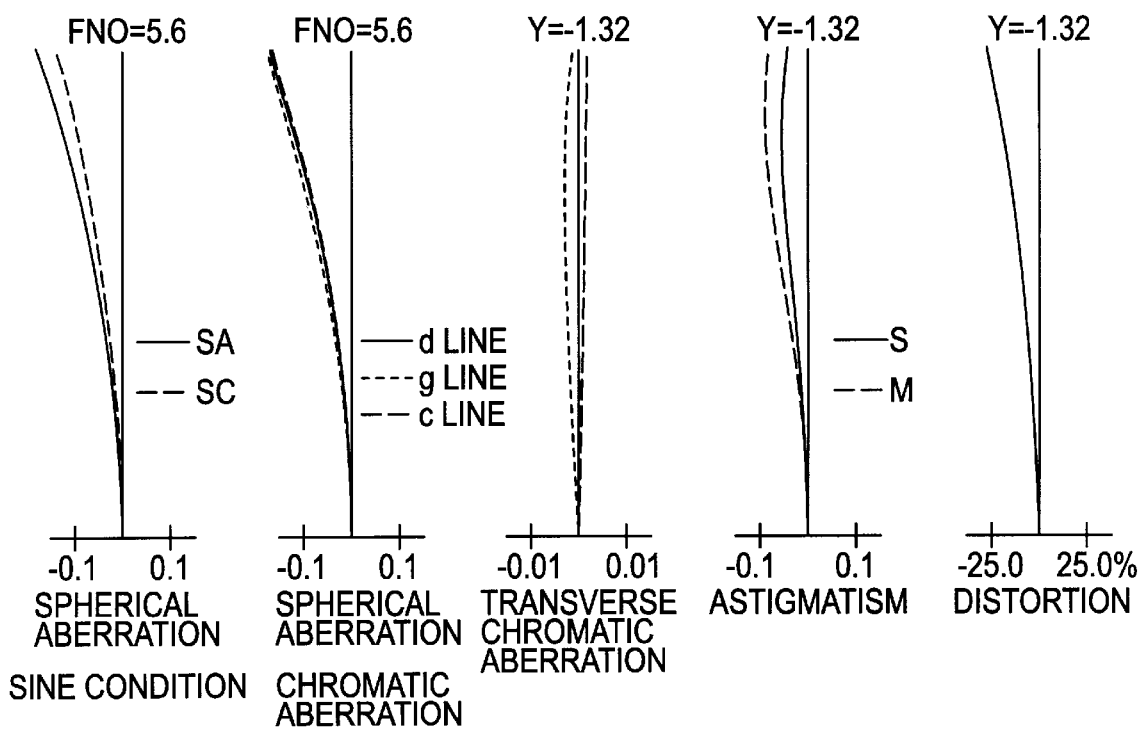
FIG. 32 shows diagrams of various aberrations of the objective lens shown in FIG. 31.
Figure 33:
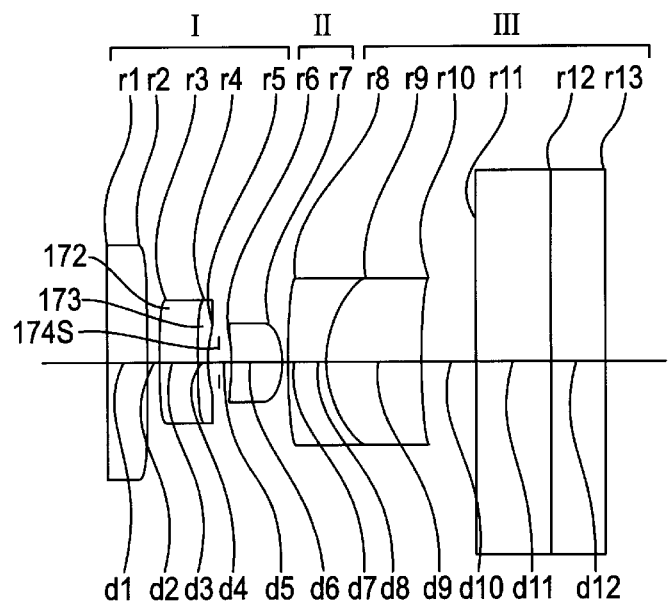
FIG. 33 is a schematic view showing a lens arrangement of an objective lens for an endoscope according to a seventeenth embodiment of the present invention.
Figure 34:
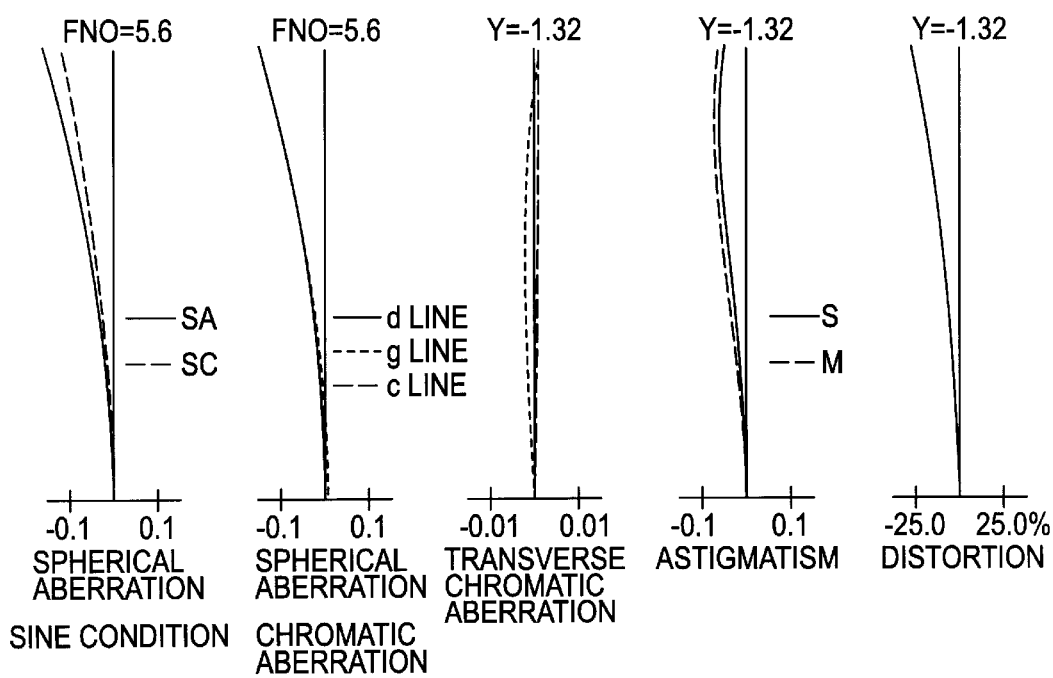
FIG. 34 shows diagrams of various aberrations of the objective lens shown in FIG. 33.
Figure 35:
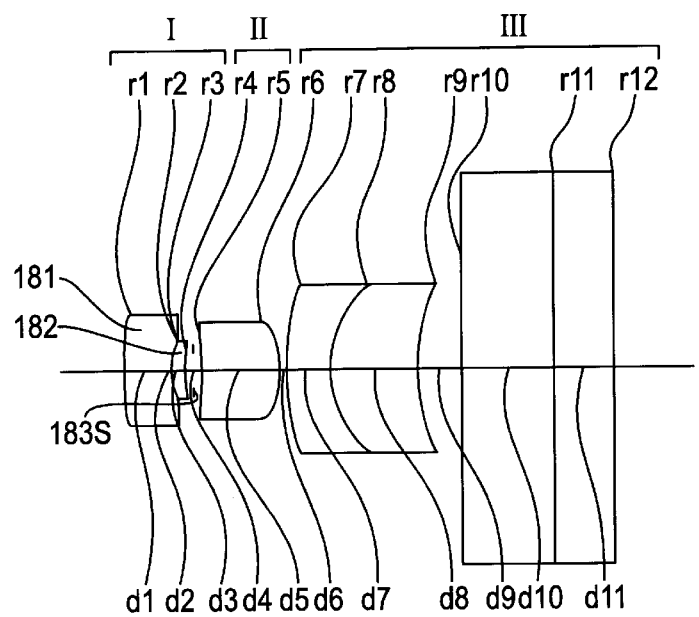
FIG. 35 is a schematic view showing a lens arrangement of an objective lens for an endoscope according to an eighteenth embodiment of the present invention.
Figure 36:
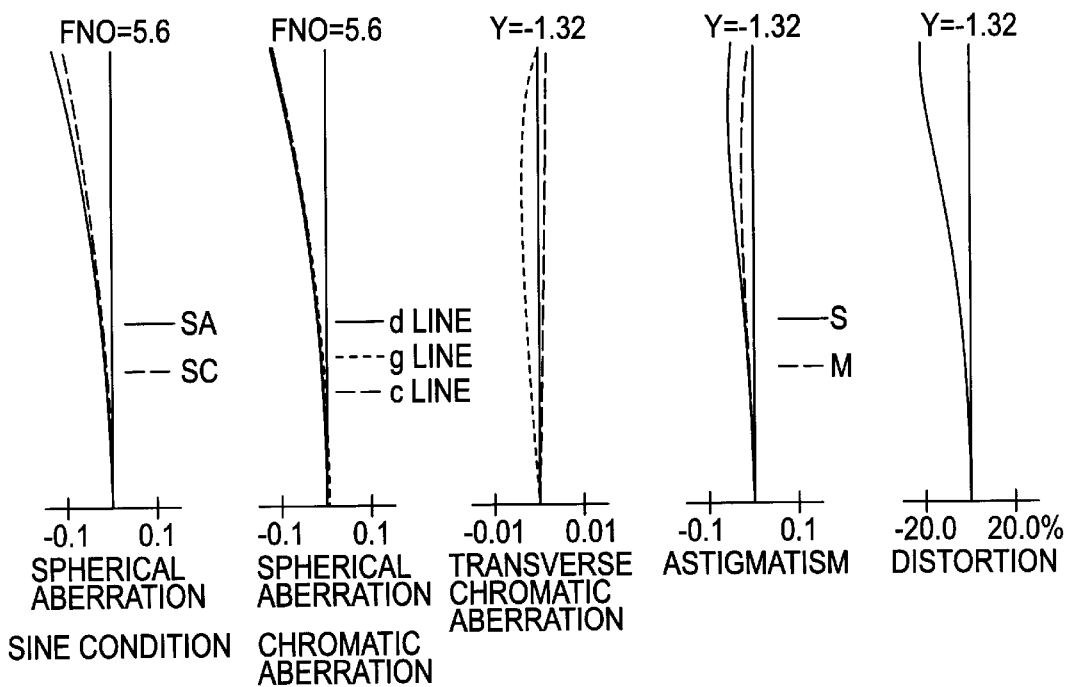
FIG. 36 shows diagrams of various aberrations of the objective lens shown in FIG. 35.
Figure 37:
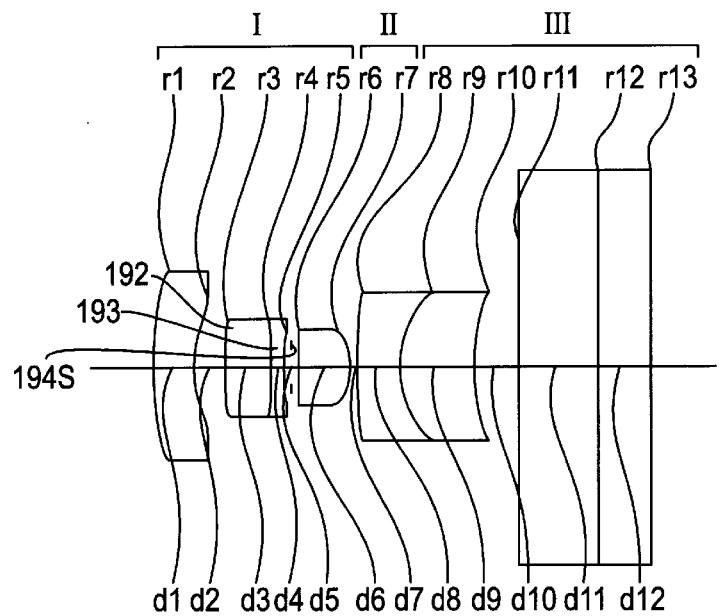
FIG. 37 is a schematic view showing a lens arrangement of an objective lens for an endoscope according to a nineteenth embodiment of the present invention.
Figure 38:
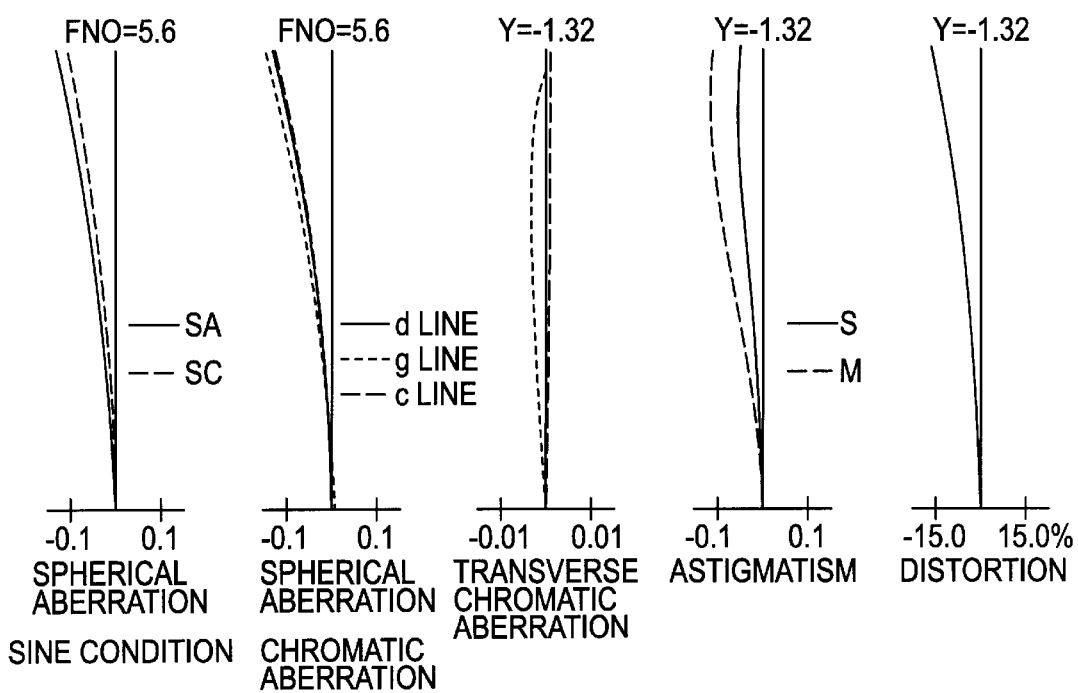
FIG. 38 shows diagrams of various aberrations of the objective lens shown in FIG. 37.
Figure 39:
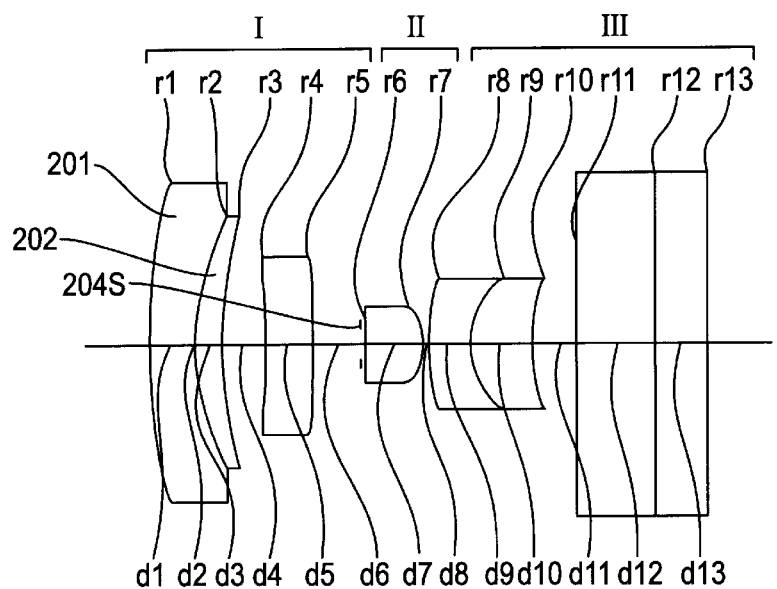
FIG. 39 is a schematic view showing a lens arrangement of an objective lens for an endoscope according to a twentieth embodiment of the present invention.
Figure 40:
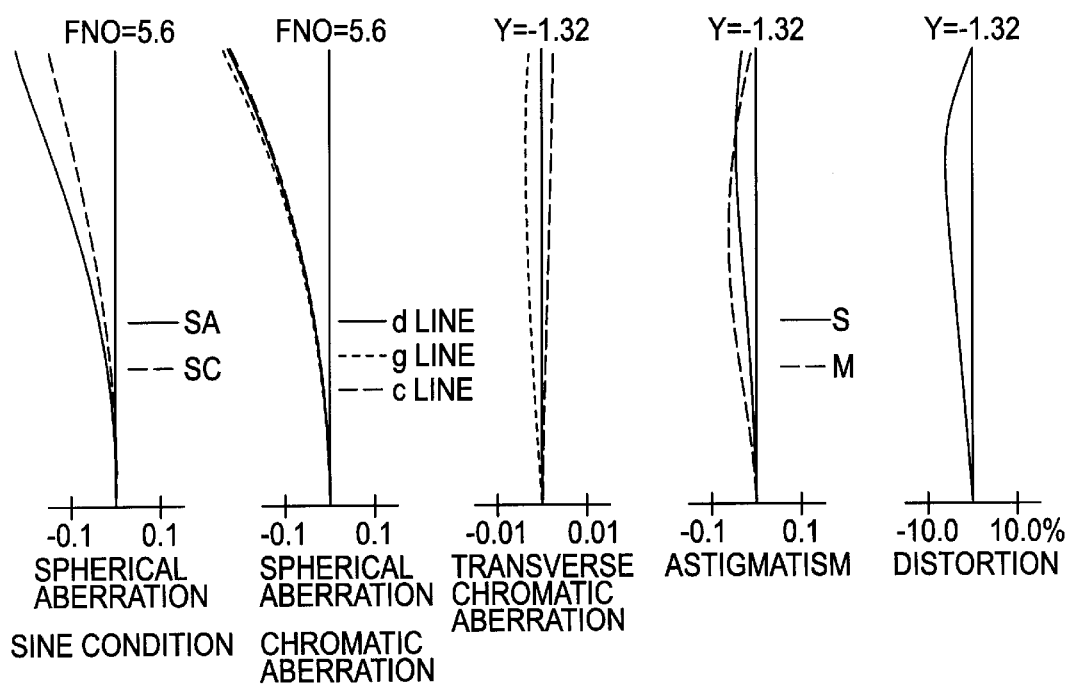
FIG. 40 shows diagrams of various aberrations of the objective lens shown in FIG. 39.
Figure 41:
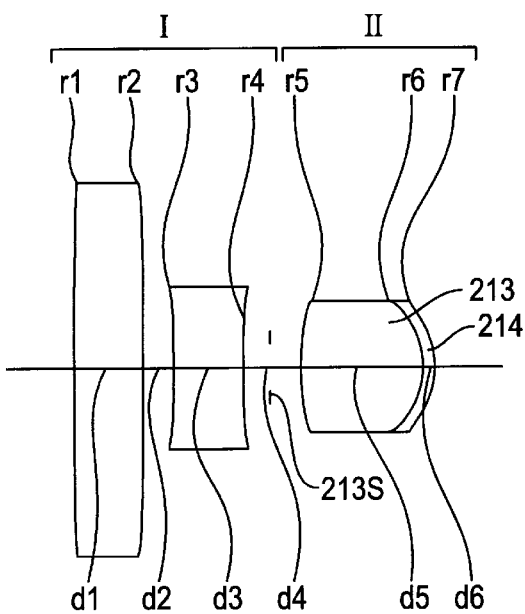
FIG. 41 is a schematic view showing a lens arrangement of an objective lens for an endoscope according to a twenty first embodiment of the present invention.
Figure 42:
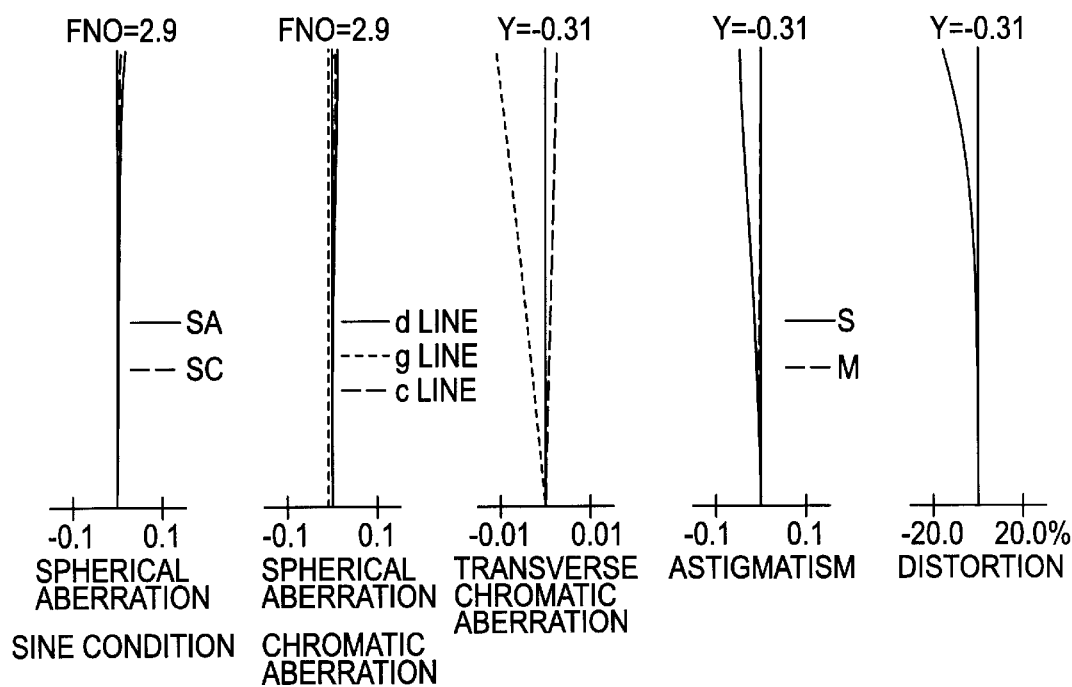
FIG. 42 shows diagrams of various aberrations of the objective lens shown in FIG. 41.
Figure 43:
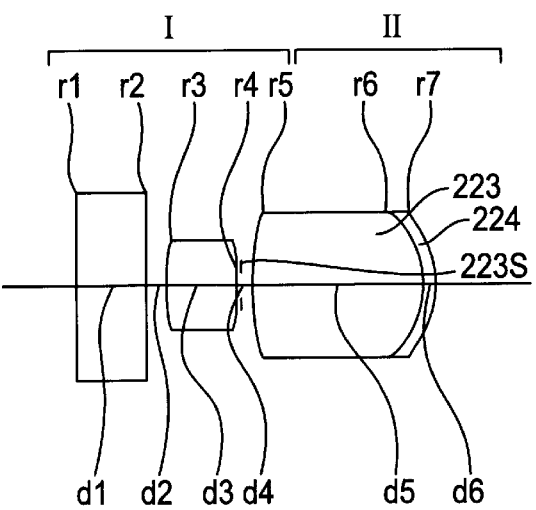
FIG. 43 is a schematic view showing a lens arrangement of an objective lens for an endoscope according to a twenty second embodiment of the present invention.
Figure 44:
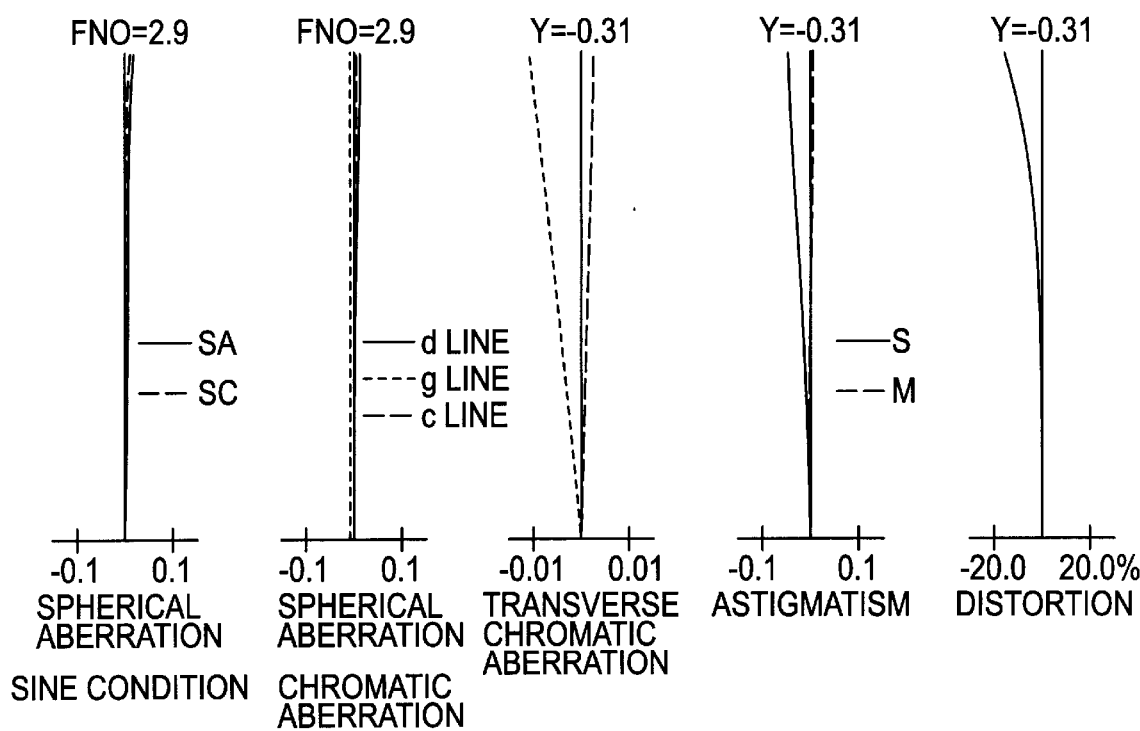
FIG. 44 shows diagrams of various aberrations of the objective lens shown in FIG. 43.
Figure 45:
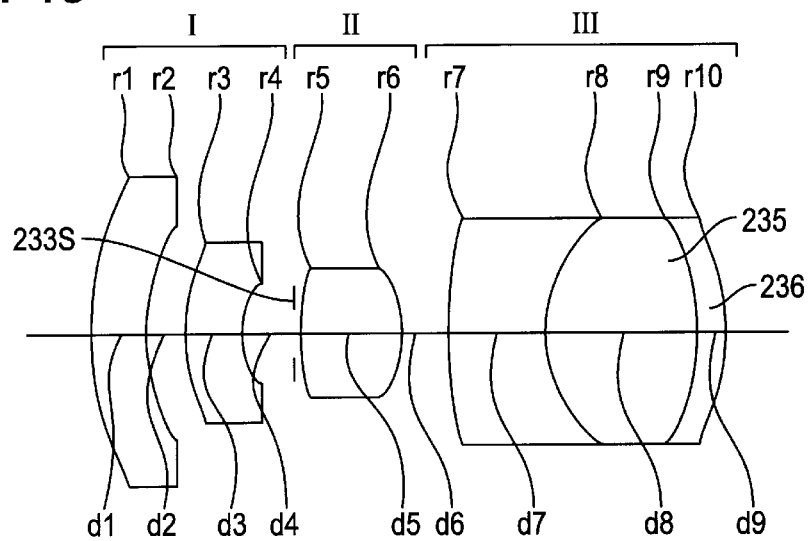
FIG. 45 is a schematic view showing a lens arrangement of an objective lens for an endoscope according to a twenty third embodiment of the present invention.
Figure 46:
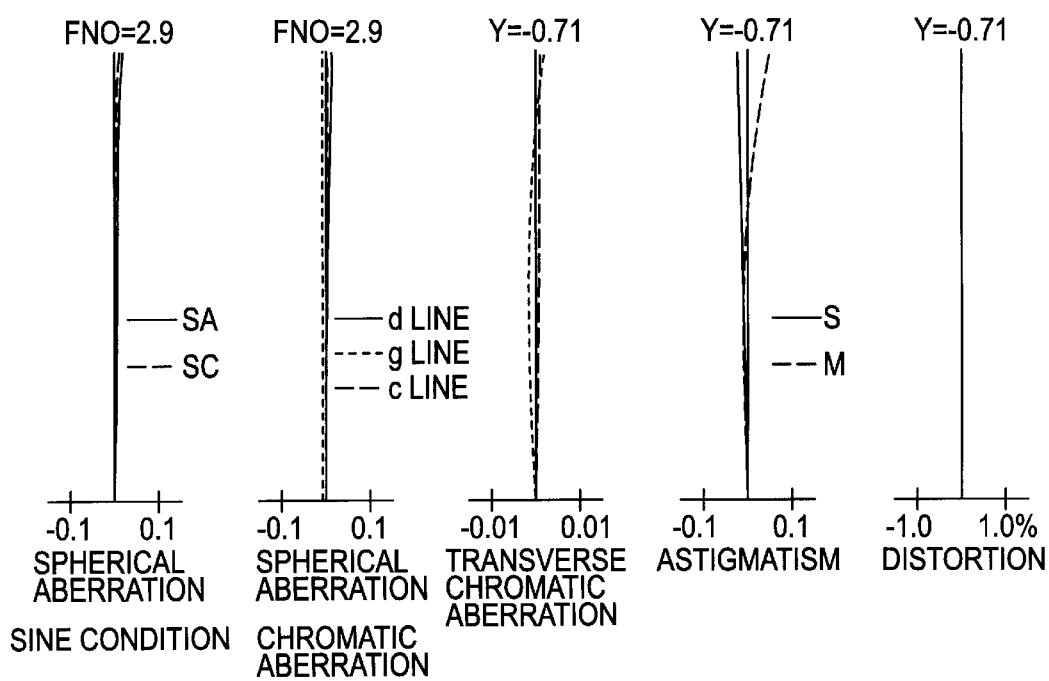
FIG. 46 shows diagrams of various aberrations of the objective lens shown in FIG. 45.
Figure 47:
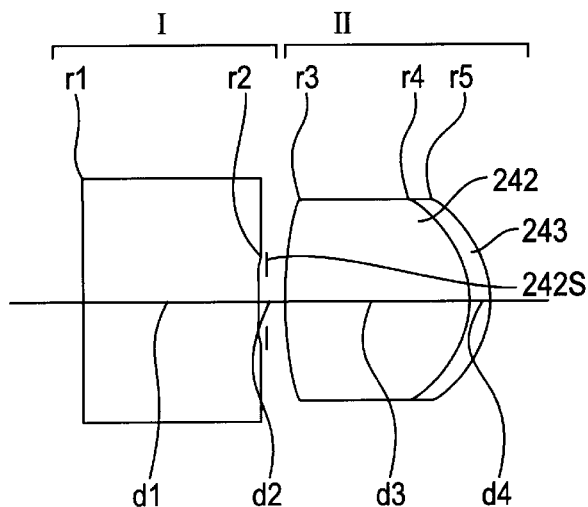
FIG. 47 is a schematic view showing a lens arrangement of an objective lens for an endoscope according to a twenty fourth embodiment of the present invention.
Figure 48:
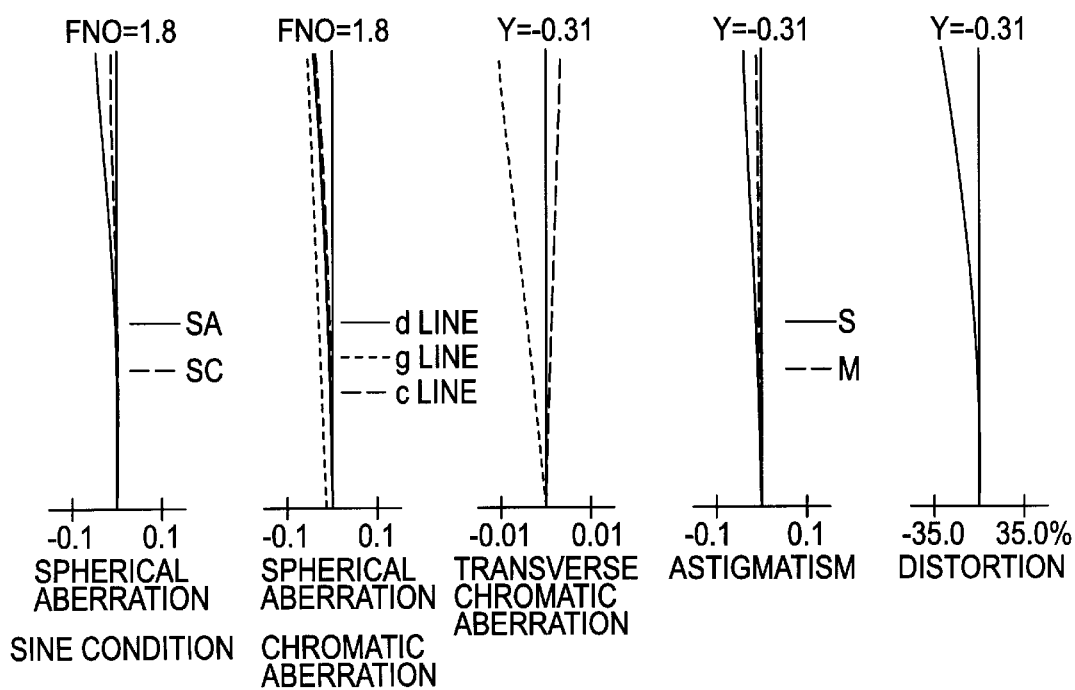
FIG. 48 shows diagrams of various aberrations of the objective lens shown in FIG. 47.
Figure 49:
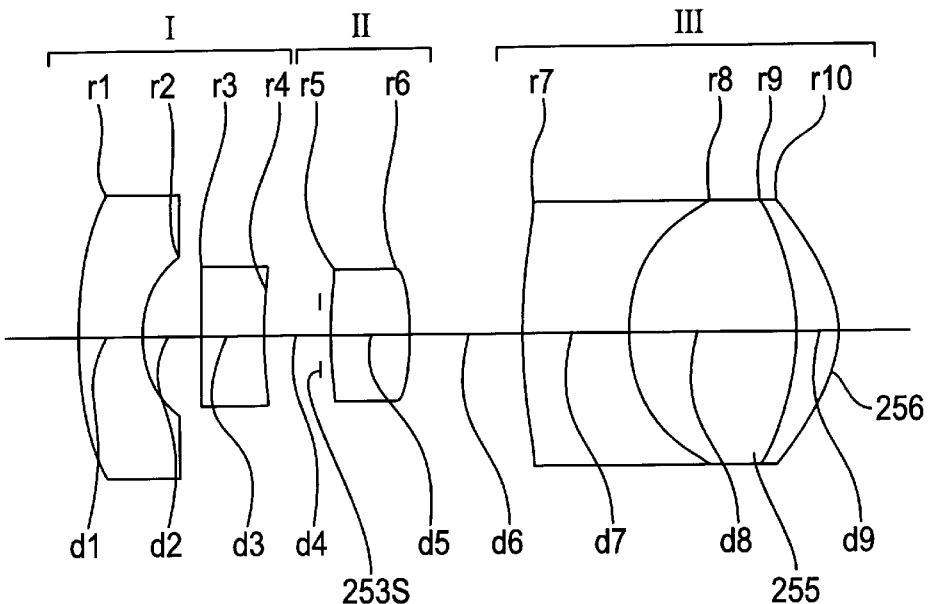
FIG. 49 is a schematic view showing a lens arrangement of an objective lens for an endoscope according to a twenty fifth embodiment of the present invention.
Figure 50:
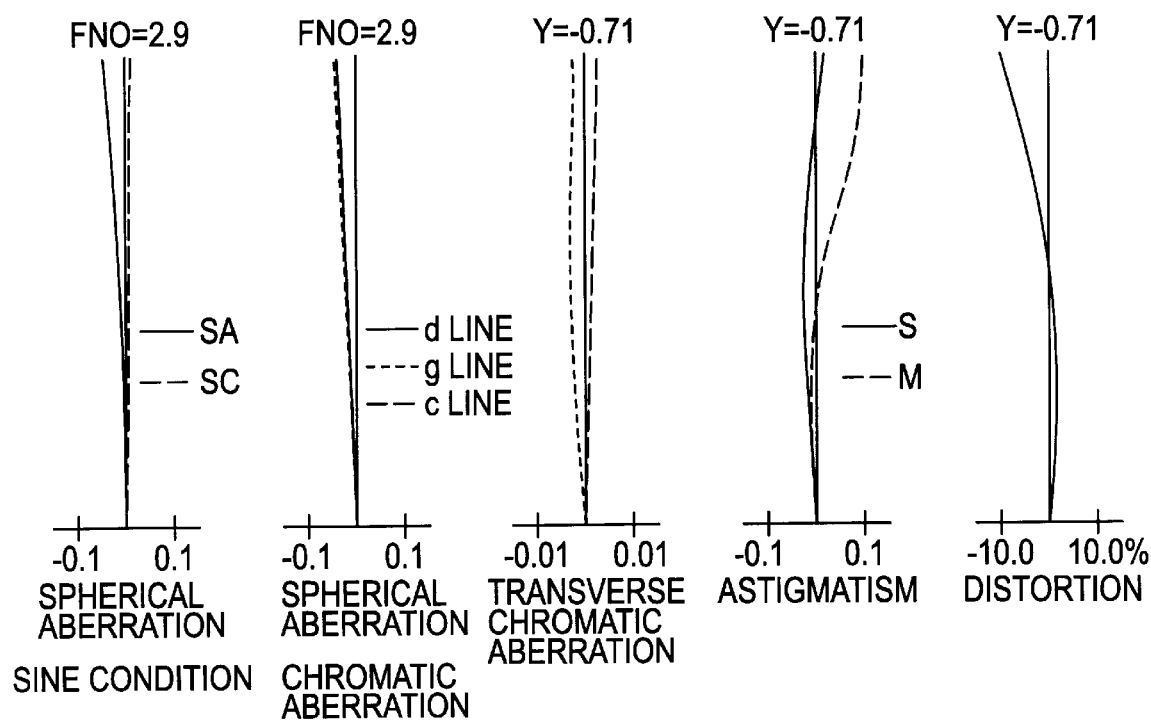
FIG. 50 shows diagrams of various aberrations of the objective lens shown in FIG. 49.
Figure 51:
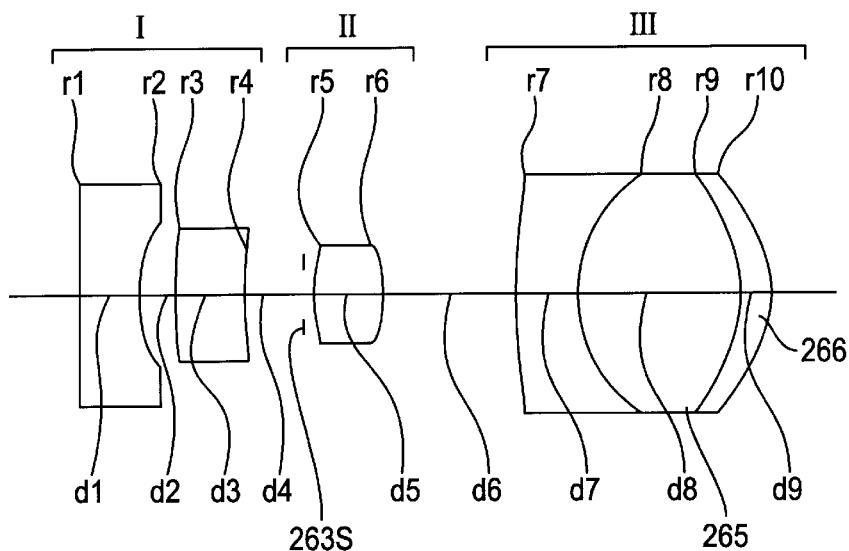
FIG. 51 is a schematic view showing a lens arrangement of an objective lens for an endoscope according to a twenty sixth embodiment of the present invention.
Figure 52:
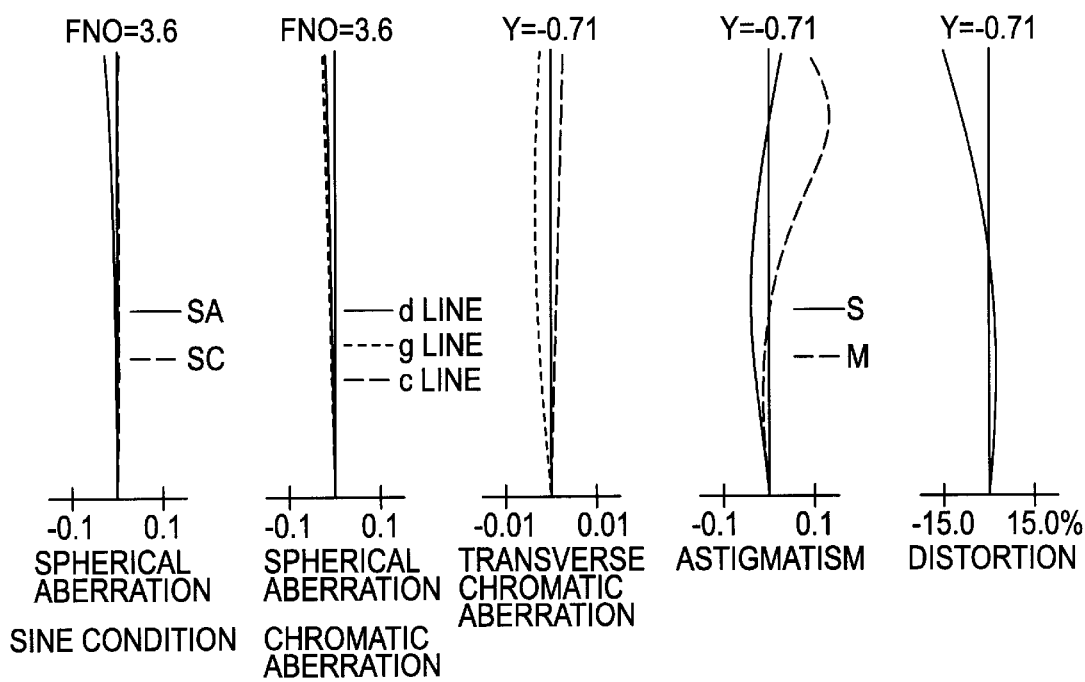
FIG. 52 shows diagrams of various aberrations of the objective lens shown in FIG. 51.
Figure 54:
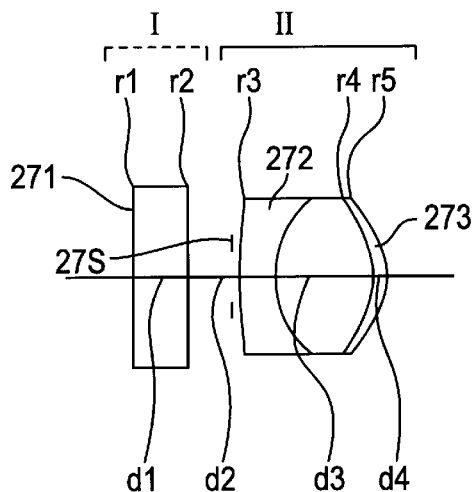
FIG. 54 is a schematic view showing a lens arrangement of an objective lens for an endoscope according to a twenty seventh embodiment of the present invention.
Figure 55:
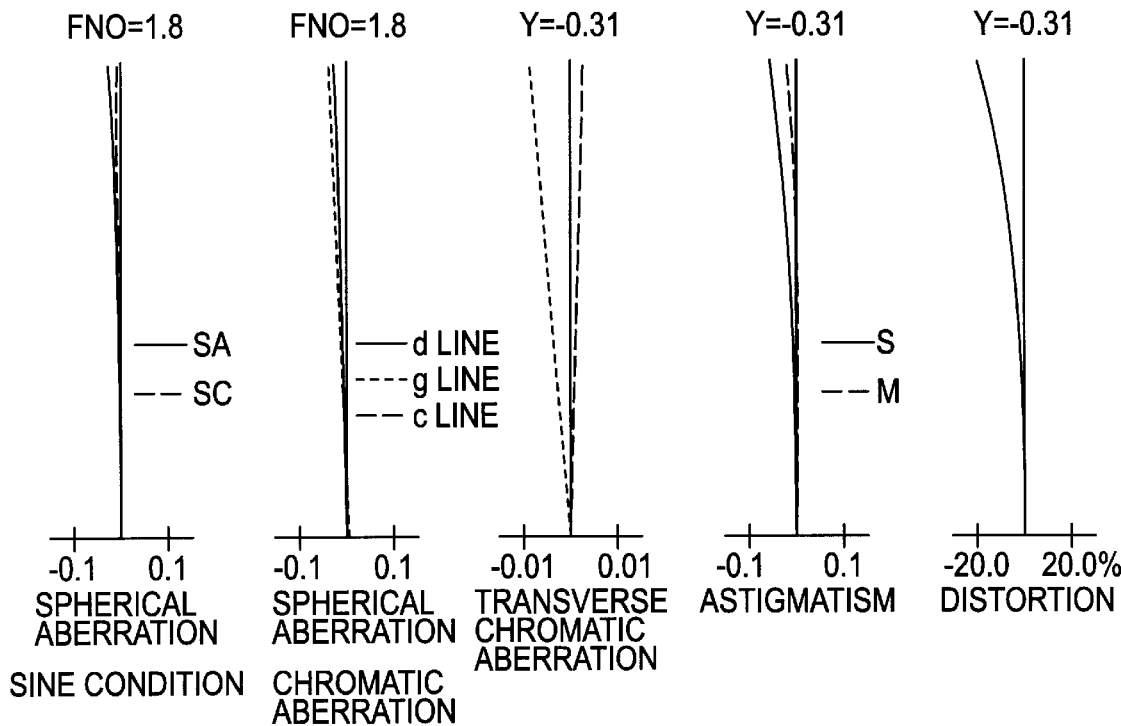
FIG. 55 shows diagrams of various aberrations of the objective lens shown in FIG. 54.
Figure 56:
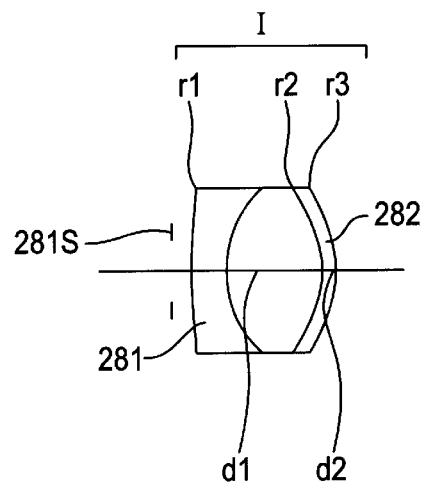
FIG. 56 is a schematic view showing a lens arrangement of an objective lens for an endoscope according to a twenty eighth embodiment of the present invention.
Figure 57:
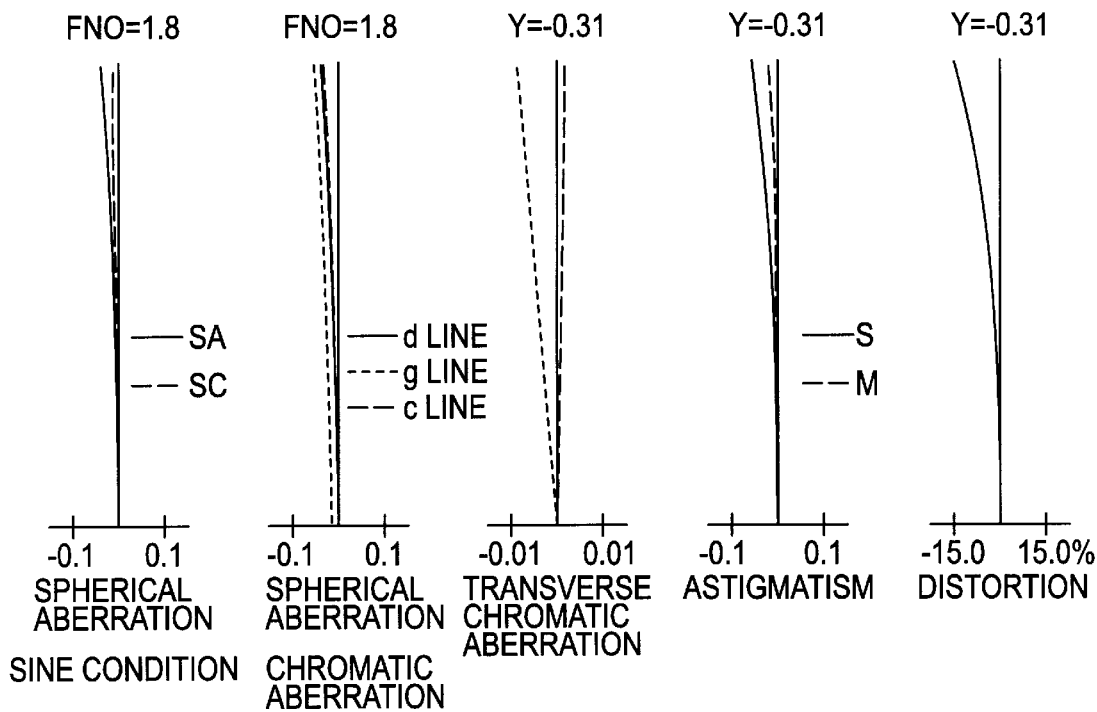
FIG. 57 shows diagrams of various aberrations of the objective lens shown in FIG. 56.
Figure 58:
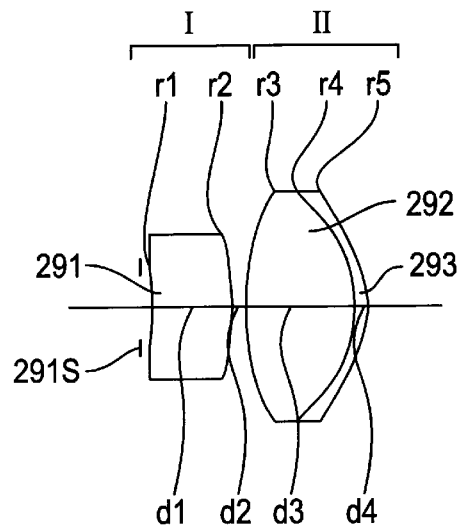
FIG. 58 is a schematic view showing a lens arrangement of an objective lens for an endoscope according to a twenty ninth embodiment of the present invention.
Figure 59:
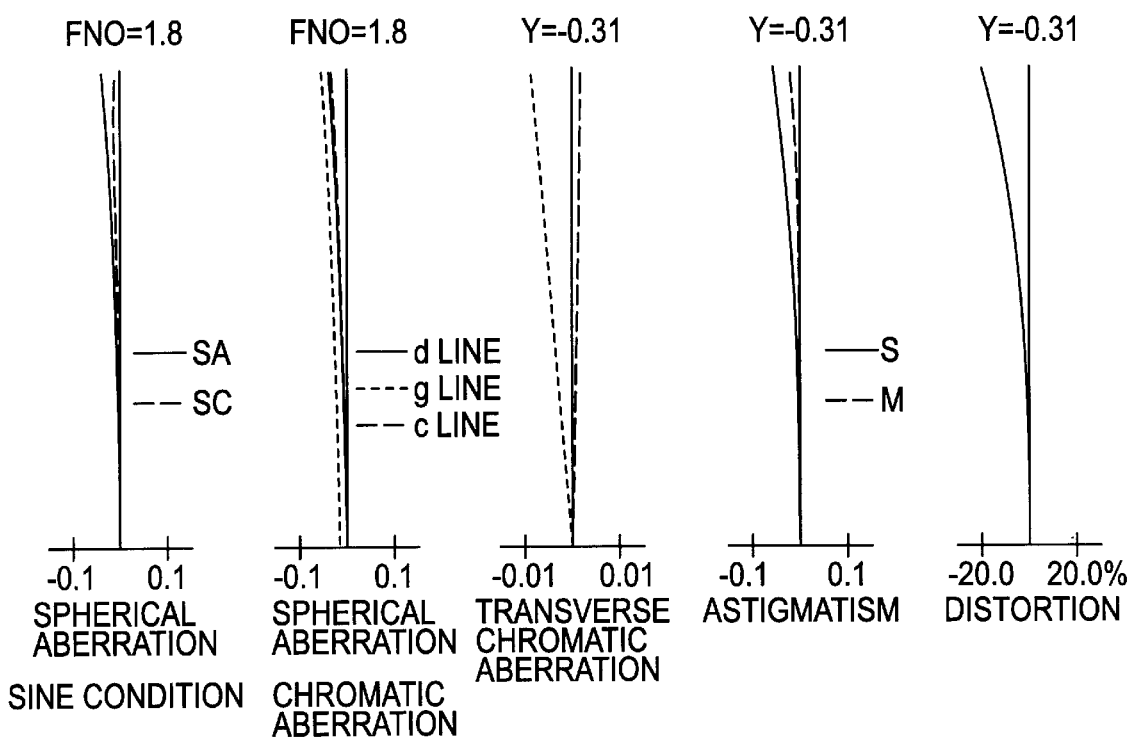
FIG. 59 shows diagrams of various aberrations of the objective lens shown in FIG. 58.
Figure 60:
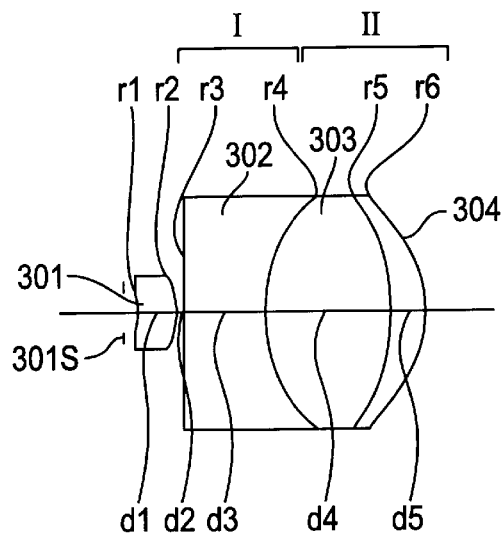
FIG. 60 is a schematic view showing a lens arrangement of an objective lens for an endoscope according to a thirtieth embodiment of the present invention.
Figure 61:
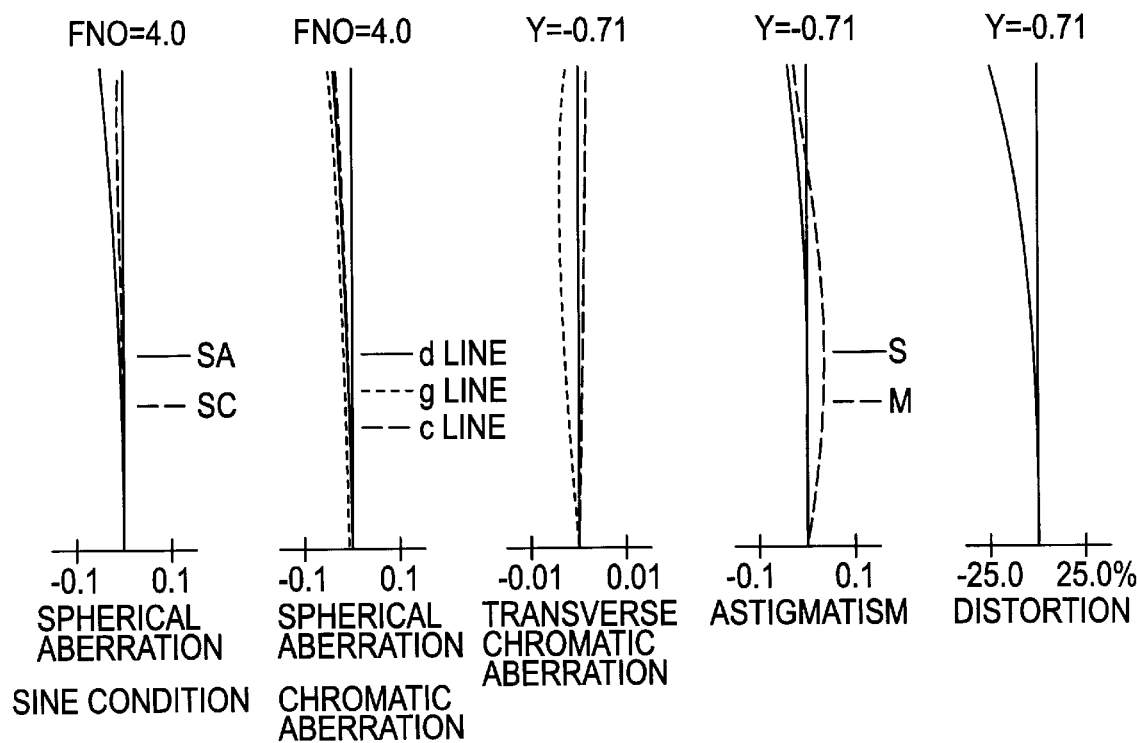
FIG. 61 shows diagrams of various aberrations of the objective lens shown in FIG. 60.
Figure 62:
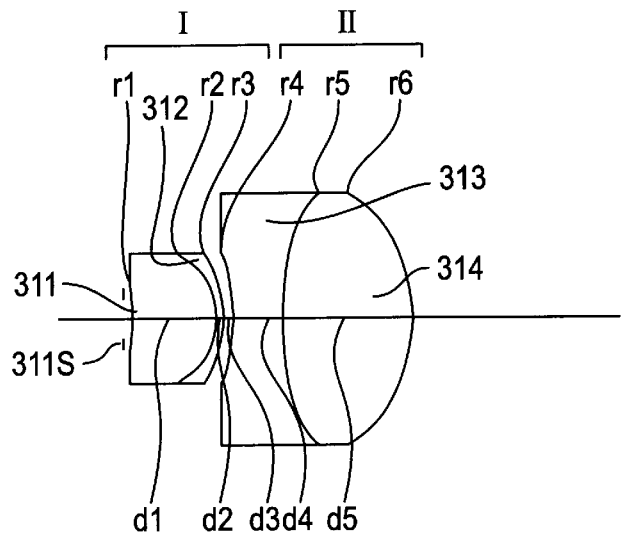
FIG. 62 is a schematic view showing a lens arrangement of an objective lens for an endoscope according to a thirty first embodiment of the present invention.
Figure 63:
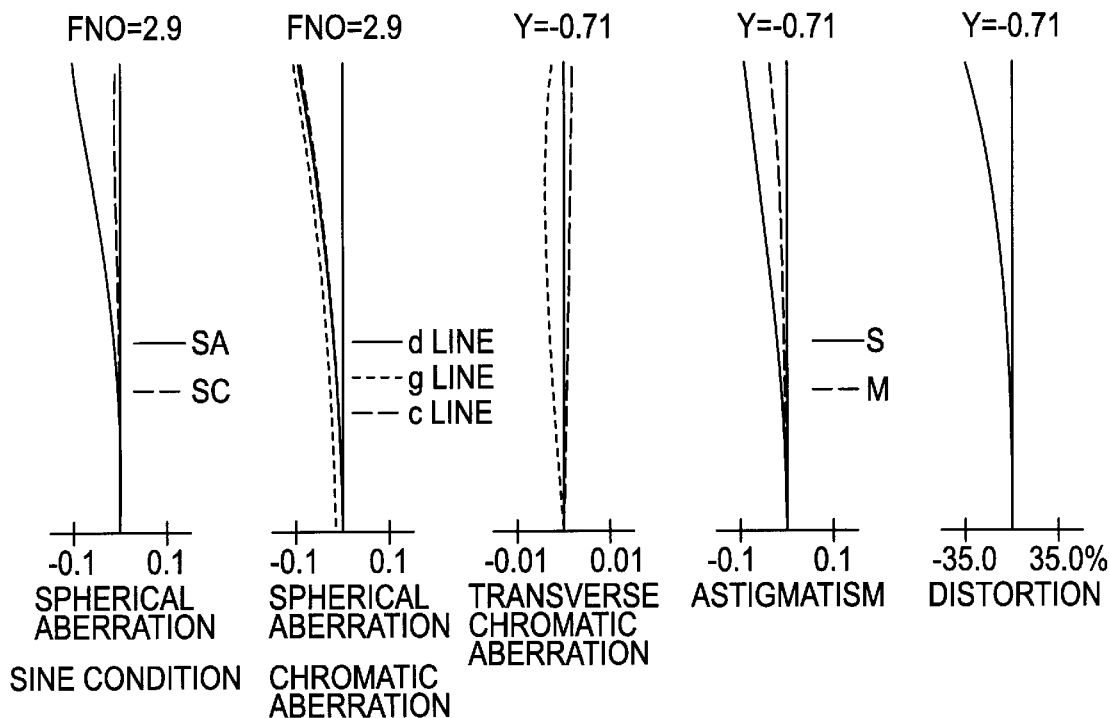
FIG. 63 shows diagrams of various aberrations of the objective lens shown in FIG. 62.
Figure 64:
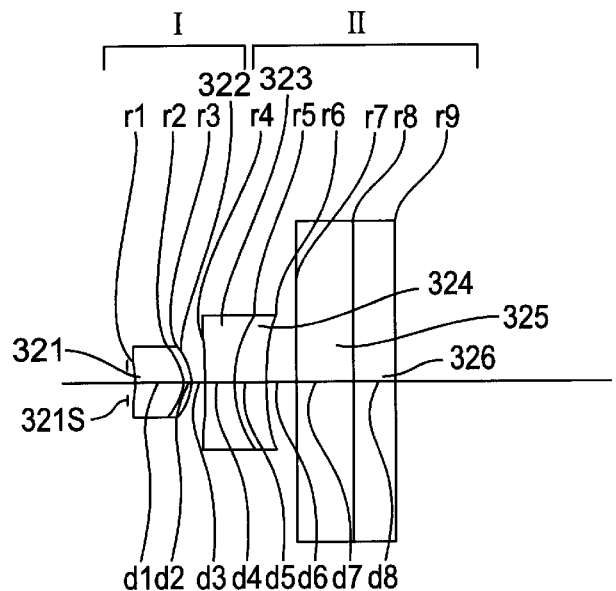
FIG. 64 is a schematic view showing a lens arrangement of an objective lens for an endoscope according to a thirty second embodiment of the present invention; and, FIG. 65 shows diagrams of various aberrations of the objective lens shown in FIG. 64.
Figure 65:
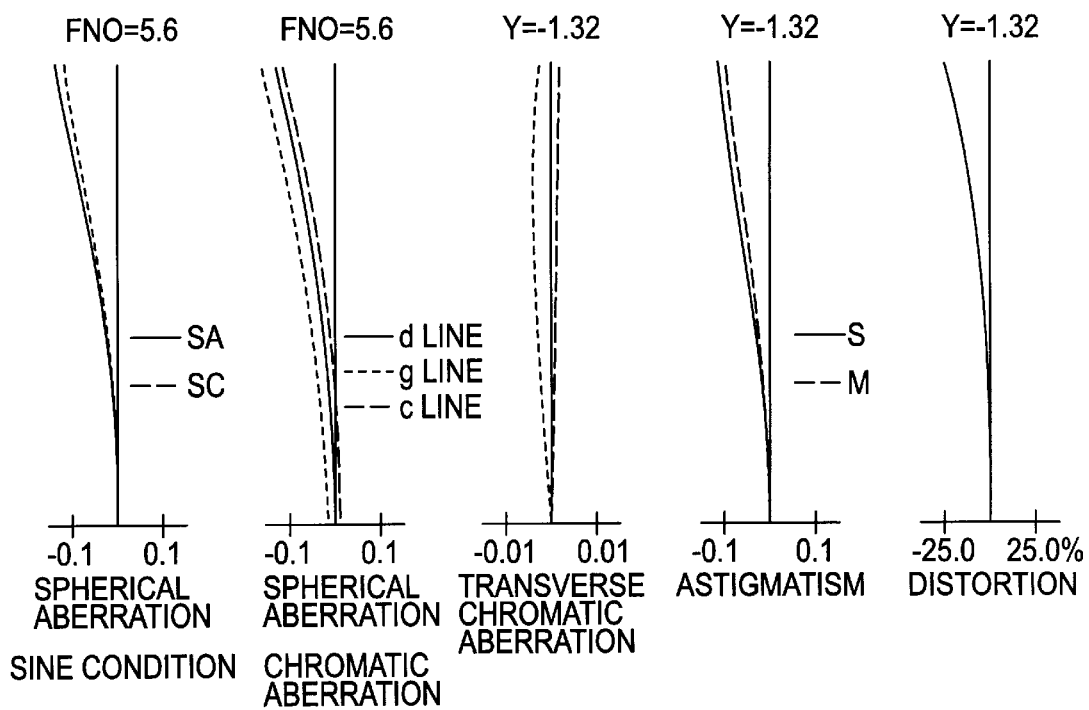

FIGS. 1 and 2 show a first embodiment of the present invention; FIGS. 3 and 4 show a 2nd embodiment; FIGS. 5 and 6 show a 3rd embodiment; FIGS. 7 and 8 show a 4th embodiment; FIGS. 9 and 10 show a 5th embodiment; FIGS. 11 and 12 show a 6th embodiment; FIGS. 13 and 14 show a 7th embodiment; FIGS. 15 and 16 show an 8th embodiment; FIGS. 17 and 18 show a 9th embodiment; FIGS. 19 and 20 show a 10th embodiment; FIGS. 21 and 22 show an 11th embodiment; FIGS. 23 and 24 show a 12th embodiment; FIGS. 25 and 26 show a 13th embodiment; FIGS. 27 and 28 show a 14th embodiment; FIGS. 29 and 30 show a 15th embodiment; FIGS. 31 and 32 show a 16th embodiment; FIGS. 33 and 34 show a 17th embodiment; FIGS. 35 and 36 show an 18th embodiment; FIGS. 37 and 38 show a 19th embodiment; FIGS. 39 and 40 show a 20th embodiment; FIGS. 41 and 42 show a 21st embodiment; FIGS. 43 and 44 show a 22nd embodiment; FIGS. 45 and 46 show a 23rd embodiment; FIGS. 47 and 48 show a 24th embodiment; FIGS. 49 and 50 show a 25th embodiment; FIGS. 51 and 52 show a 26th embodiment; FIGS. 54 and 55 show a 27th embodiment; FIGS. 56 and 57 show a 28th embodiment; FIGS. 58 and 59 show a 29th embodiment; FIGS. 60 and 61 show a 30th embodiment; FIGS. 62 and 63 show a 31st embodiment; and, FIGS. 64 and 65 show a 32nd embodiment, respectively.

In the 1st to 26th embodiments, the front lens group is comprised of a first lens group I; and, the rear lens group is comprised of either only a second lens group II, or a second lens group II and a third lens group III.

In the first (FIG. 1) and second (FIG. 3) embodiments, the terminal surfaces of the glass lenses of the first lens group I and the third lens group III are provided with aspheric resin layers. Namely, the glass lens 11 (FIG. 1) or 21 (FIG. 3) is located closest to an object to be photographed, and the second surface No. 2 thereof on the image side is provided with a transparent resin layer 12 (or 22) applied thereto, which is formed by pressing a transparent synthetic resin material. The third surface No. 3, belonging to the transparent resin layer, on the image side is an aspherical surface. The glass lenses 15 (FIG. 1) and 25 (FIG. 3) of the third lens group III, that are located furthest from the object (i.e. on the image side), are provided on the terminal surfaces (eighth surfaces) No. 8, with transparent resin layers 16 (FIG. 1) and 26 (FIG. 3) formed by pressing a transparent synthetic resin material. The ninth surfaces No. 9, belonging to the transparent resin layers 16 and 26, on the image side are aspherical surfaces. The aperture stop 13S (23S) is provided between the first lens group I and the second lens group II.

In the third embodiment (FIG. 5), the terminal surface of the glass lens of the first lens group I is provided with an aspherical resin layer. Namely, the glass lens 31 is located closest to the object and is provided, on the second surface No. 2 thereof on the image side, with a transparent resin layer 32 formed by pressing a synthetic resin material. The surface No. 3, belonging to the transparent resin layer, on the image side is an aspherical surface. The aperture stop 33S is provided between the first lens group I and the second lens group II.

In the fourth (FIG. 7), fifth (FIG. 9), and sixth (FIG. 11) embodiments, the terminal surfaces of the glass lenses of the third lens group III furthest from the object are provided with aspherical resin layers. Namely, the glass lenses 44 (FIG. 7), 54 (FIG. 9), and 64 (FIG. 11) are located closest to the image side, and the seventh (terminal) surfaces No. 7 thereof furthest from the object are each provided with a transparent resin layer 45 (55 or 65) applied thereto, which is formed by pressing a transparent synthetic resin material. The eighth surfaces No. 8, belonging to the transparent resin layers, on the image side are aspherical surfaces. The aperture stop 42S (52S or 62S) is provided between the first lens group I and the second lens group II.

In the seventh embodiment (FIG. 13), the terminal surfaces of the glass lenses of the first and third lens groups I and III are provided with aspherical resin layers. Namely, the glass lens 71 is located closest to the object, and the second surface No. 2 thereof on the image side is provided with a transparent resin layer 72 applied thereto, which is formed by pressing a transparent synthetic resin material. The third surface No. 3, belonging to the transparent resin layer, on the image side is an aspherical surface. The glass lens 75 of the third lens group III that is located furthest from the object (i.e., on the image side) is provided on the terminal surface (eighth surface) No. 8, with a transparent resin layer 76 formed by pressing a transparent synthetic resin material. The ninth surface No. 9, belonging to the transparent resin layer 76, on the image side is an aspherical surface. The aperture stop 73S is provided between the first lens group I and the second lens group II.

In the eighth embodiment (FIG. 15), the terminal surface of the glass lens of the first lens group I is provided with an aspherical resin layer. Namely, the glass lens 81 is located closest to the object and is provided, on the second surface No. 2 thereof on the image side, with a transparent resin layer 82 formed by pressing a synthetic resin material. The surface No. 3, belonging to the transparent resin layer 82, on the image side is an aspherical surface. The aperture stop 83S is provided between the first lens group I and the second lens group II.

In the ninth (FIG. 17) and eleventh (FIG. 21) embodiments, the terminal surface of the glass lens of the third lens group III furthest from the object is provided with an aspherical resin layer. Namely, the glass lenses 94 and 114 are located closest to the image and are provided, on the seventh surfaces No. 7 thereof on the image side, with transparent resin layers 95 and 115 which are formed by pressing a synthetic resin material. The eighth surfaces No. 8, belonging to the transparent resin layers, on the image side are aspherical surfaces. The aperture stops 92S and 112S are respectively provided between the first lens group I and the second lens group II.

In the tenth embodiment (FIG. 19), the terminal, surface of the glass lens of the second lens group II is provided with an aspherical resin layer. Namely, the glass lens 102 of the second lens group II is provided, on the fourth surface No. 4 thereof on the image side, with a transparent resin layer 103 formed by pressing a synthetic resin material. The fifth surface No. 5, belonging to the transparent resin layer, on the image side is an aspherical surface. The aperture stop 102S is provided between the first lens group I and the second lens group II.

In the twelfth embodiment (FIG. 23), the lens of the first lens group I on the object side is made of a glass lens 121 which is provided on the surface thereof on the image side with a transparent resin layer 122 formed by pressing a synthetic resin material. The third surface No. 3, belonging to the transparent resin layer, on the image side is an aspherical surface. The aperture stop 124S is provided between the first lens group I and the second lens group II.

In the thirteenth embodiment (FIG. 25), the lens of the third lens group III on the image side is a glass lens 135 which is provided on the surface thereof on the image side with a transparent resin layer 136 formed by pressing a synthetic resin material. The tenth surface No. 10, belonging to the transparent resin layer 136, on the image side is an aspherical surface. The aperture stop 133S is provided between the first lens group I and the second lens group II.

The fourteenth to twentieth embodiments are all applied to an electronic endoscope. In these embodiments, an image sensor, such as a CCD image pickup device (not shown) is used instead of an optical fiber bundle. To this end, a glass cover (flat plate) is provided just in front of the image surface and is closely adhered to the image sensor by an adhesive. In the illustrated embodiments, the rearmost two optical elements are glass covers. Thus, the back focal distance fB is 0 (zero).

In the fourteenth embodiment (FIG. 27), the first lens group I is comprised of a single glass lens 141 which is provided on the surface thereof on the image side with a transparent resin layer 142 formed by pressing a synthetic resin material. The third surface No. 3, belonging to the transparent resin layer, on the image side is an aspherical surface. The aperture stop 143S is provided between the first lens group I and the second lens group II.

In the fifteenth embodiment (FIG. 29), the lens of the first lens group I on the image side is a glass lens 152 which is provided, on the surface thereof on the image side, with a transparent resin layer 153 formed by pressing a synthetic resin material. The fifth surface No. 5, belonging to the transparent resin layer, on the image side is an aspherical surface. The aperture stop 154S is provided between the first lens group I and the second lens group II.

In the sixteenth embodiment (FIG. 31), the lens of the first lens group I on the object side is made of a glass lens 161 which is provided, on the surface thereof on the image side, with a transparent resin layer 162 formed by pressing a synthetic resin material. The third surface No. 3, belonging to the transparent resin layer 162, on the image side is an aspherical surface. The aperture stop 164S is provided between the first lens group I and the second lens group II.

In the seventeenth embodiment (FIG. 33), the lens of the first lens group I on the image side is made of a glass lens 172 which is provided, on the surface thereof on the image side, with a transparent resin layer 173 formed by pressing a synthetic resin material. The fifth surface No. 5, belonging to the transparent resin layer 173, on the image side is an aspherical surface. The aperture stop 174S is provided between the first lens group I and the second lens group II.

In the eighteenth embodiment (FIG. 35), the lens of the first lens group I on the image side is made of a glass lens 181 which is provided, on the surface thereof on the image side, with a transparent resin layer 182 formed by pressing a synthetic resin material. The third surface No. 3, belonging to the transparent resin layer 182, on the image side is an aspherical surface. The aperture stop 183S is provided between the first lens group I and the second lens group II.

In the nineteenth embodiment (FIG. 37), the lens of the first lens group I on the image side is made of a glass lens 192 which is provided on the surface thereof on the image side with a transparent resin layer 193 formed by pressing a synthetic resin material. The fifth surface No. 5, belonging to the transparent resin layer 193, on the image side is an aspherical surface. The aperture stop 194S is provided between the first lens group I and the second lens group II.

In the twentieth embodiment (FIG. 39), the lens of the first lens group I on the object side is made of a glass lens 201 which is provided, on the surface thereof on the image side, with a transparent resin layer 202 formed by pressing a synthetic resin material. The third surface No. 3, belonging to the transparent resin layer 202, on the image side is an aspherical surface. The aperture stop 204S is provided between the first lens group I and the second lens group II.

In the twenty first (FIG. 41) and twenty second (FIG. 43) embodiments, the lens of the second lens group II on the object side is made of a glass lens 213 (or 223) which is provided, on the surfaces thereof on the image side, with a transparent resin layer 214 (or 224) formed by pressing a synthetic resin material. The surfaces of the transparent resin layers 214 and 224 on the image side are aspherical surfaces. The aperture stops 213S and 223S are respectively provided between the first lens group I and the second lens group II.

In the twenty third embodiment (FIG. 45), the lens of the third lens group III on the image side is made of a glass lens 235 which is provided, on the surface thereof on the image side, with a transparent resin layer 236 formed by pressing a synthetic resin material. The tenth surface No. 10, belonging to the transparent resin layer 236, on the image side is an aspherical surface. The aperture stop 233S is provided between the first lens group I and the second lens group II.

In the twenty fourth embodiment (FIG. 47), the lens of the second lens group II on the object side is made of a glass lens 242 which is provided, on the surface thereof on the image side, with a transparent resin layer 243 formed by pressing a synthetic resin material. The fifth surface No. 5, belonging to the transparent resin layer 243, on the image side is an aspherical surface. The aperture stop 242S is provided between the first lens group I and the second lens group II. In the twenty fifth (FIG. 49) and twenty sixth (FIG. 51) embodiments, the lens of the third lens group III on the image side is made of a glass lens 255 (or 265) which is provided, on the surfaces thereof on the image side, with a transparent resin layer 256 (or 266) formed by pressing a synthetic resin material. The tenth surfaces, belonging to the transparent resin layers 256 and 266, on the image side are aspherical surfaces. The aperture stops 253S and 263S are respectively provided between the first lens group I and the second lens group II.

In the above mentioned embodiments, the angle of view 2w is 2w=90° (in the 23rd embodiment), 2w=100° (in the 1st–5th, and 7th–22nd embodiments), 2w=110° (in the 24th embodiment), 2w=120° (in the 6th, 11th, 25th, and 26th embodiments), respectively. The F-number is F=2.9 (in the 1st–14th, 21st–23rd, and 25th embodiments), F=5.6 (in the 15th–20th embodiments), F=1.8 (in the 24th embodiment), and F=3.6 (in the 26th embodiment), respectively. The F-number F refers to a value corresponding with an object at infinite, and the angle of view 2w refers to a value corresponding with a predetermined object distance (design value) which is 10.0 mm (in the 1st–13th, 23rd, 25th and 26th embodiments), 6.0 mm (in the 14th–20th embodiments), or 8.0 mm (in the 21st, 22nd, and 24th embodiments).

The 27th to 31st embodiments are applied to an objective lens for a fiber scope, and the 32nd embodiment is applied to an objective lens for an electronic scope, respectively. The 27th embodiment includes a glass cover (lens group I), but there is no glass cover in the 28th to 32nd embodiments. In the 27th and 28th embodiments, the rear lens group is comprised of a single lens group II, I, respectively. In the 29th through 32nd embodiments, the rear lens group is comprised of two lenses. Namely, the rear lens group is comprised of two positive lens groups I, II (in the 29th–31st embodiments), and a positive lens group and a negative lens group in combination, in this order from the object side in the 32nd embodiment, respectively. Note that although only the optical elements are shown in the drawings, the optical elements are secured to or held by a lens barrel, etc., at the front end of an associated endoscope or rigid endoscope, etc.

In the twenty seventh and twenty eighth embodiments, the rear lens groups 272 and 281 are each made of a glass lens group II, I whose refractive index n is larger than 1.65 (n>1.65). The glass lenses are provided, on the fourth and second surfaces No. 4 and No. 2 thereof on the image side, with transparent resin layers 273 and 282, respectively formed by pressing a synthetic resin material. The fifth and third surfaces No. 5 and No. 3, belonging to the transparent resin layers 273 and 282, on the image side (that are not adhered to the lens surfaces No. 4 and No. 2 of the glass lenses 272 and 281) are both aspherical surfaces to form compound aspherical lenses comprised of the rear lens group 272 and the transparent layer 273; and, the rear lens group 281 and the transparent layer 282, respectively. The aperture stops 272S and 281S are respectively provided in the space located closer to the object than the rear lens groups 272 and 281, respectively.

In the twenty ninth embodiment, at least the second lens 292, of the two rear lenses (lens elements) 291 and 292, is made of a glass lens whose refractive index n is more than 1.65 (n>1.65). The glass lens is provided, on the fourth surface No. 4 thereof on the image side, with a transparent resin layer 293 formed by pressing a synthetic resin material. The fifth surface No. 5, belonging to the transparent resin layer 293, on the image side (that is not adhered to the lens surface No. 4 of the second lens 292) is an aspherical surface to form a compound aspherical lens comprised of the second lens 292 and the transparent layer 293. The aperture stop 291S is provided in the space located closer to the object than the first lens 291.

In the thirtieth embodiment, among the first lens 301 of positive power, the second lens 302 of negative power, and the third lens 303 of positive power, of the rear lens group, at least the third lens 303 is made of a glass lens whose refractive index n is more than 1.65 (n>1.65). The glass lens 303 is provided, on the fifth surface No. 5 thereof on the image side, with a transparent resin layer 304 formed by pressing a synthetic resin material. The sixth surface No. 6, belonging to the transparent resin layer 304, on the image side (that is not adhered to the lens surface No. 5 of the third lens 303) is an aspherical surface to form a compound aspherical lens comprised of the third lens 303 and the transparent layer 304. The aperture stop 301S is provided in the space located closer to the object than the first lens 301.

In the thirty first embodiment, among the first lens 311 of positive power, the second lens 313 of negative power, and the third lens 314 of positive power, of the rear lens group, the first lens 311 is made of a glass lens whose refractive index n is more than 1.65 (n>1.65). The glass lens 311 is provided, on the second surface No. 2 thereof on the image side, with a transparent resin layer 312 formed by pressing a synthetic resin material. The third surface No. 3, belonging to the transparent resin layer 312, on the image side (that is not adhered to the lens surface No. 2 of the first lens 311) is an aspherical surface to form a compound aspherical lens comprised of the first lens 311 and the transparent layer 312. The aperture stop 311S is provided in the space located closer to the object than the first lens 311.

In the thirty second embodiment, among the first lens 321 of positive power, the second lens 323 of negative power, and the third lens 324 of positive power, of the rear lens group, at least the first lens 321 is made of a glass lens whose refractive index n is more than 1.65 (n>1.65). The glass lens 321 is provided, on the second surface No. 2 thereof on the image side, with a transparent resin layer 322 formed by pressing a synthetic resin material. The third surface No. 3, belonging to the transparent resin layer 322, on the image side (that is not adhered to the lens surface No. 2 of the first lens) is an aspherical surface to form a compound aspherical lens comprised of the first lens 321 and the transparent layer 322. The aperture stop 321S is provided in the space located closer to the object than the first lens 321. Note that numerals 325 and 326 designate the glass cover and the adhesive layer for a CCD image pickup device used in an electronic endoscope.

In the embodiments mentioned above, a glass product under the trade name "LAH58" marketed by OHARA K. K., can be used as the glass lens, in view of a chemical resistance, a demand for correction of aberrations, polishing efficiency and machinability, etc. The LAH58 has a high transition point (transition temperature) equal to 730° C. and accordingly no molding process can be effectively applied to the LAH58.

Moreover, no glass material having the substantially same refractive index and Abbe number as those of the LAH58 and having a transition point low enough to apply the glass molding process exists. Although the transparent aspherical surface layer is made of thermosetting resin in the above-mentioned embodiments, it is possible to use other resin materials, such as optically setting resin, etc. The refractive index of resin material to be used is not limited to a specific value.

Numerical data of the 1st–32nd embodiments are shown in Tables below and aberrations thereof are shown in FIGS. 2, 4, 6, 8, 10, 12, 14, 16, 18, 20, 22, 24, 26, 28, 30, 32, 34, 36, 38, 40, 42, 44, 46, 48, 50, 52, 55, 57, 59, 61, 63, and 65. In the drawings and tables, "SA" designates the spherical aberration; "SC" the sine condition; "d-line", "g-line" and "C-line" the chromatic aberrations represented by the spherical aberrations, and the transverse chromatic aberrations, at the respective wavelengths; and "S" and "M" the sagittal ray and meridional ray, respectively.

Furthermore, "$F_{NO}$" designates the f-number; "f" the focal length (mm); "M" the lateral magnification, "W" the half angle of view (degree); "$f_B$" the back focal distance (mm); "r" the radius of curvature of each lens surface (mm); "d" the distance between the surfaces (mm); "$n_d$" the refractive index of the d-line; and "vd" the Abbe number of the d-line, respectively.

TABLE 1

FIRST EMBODIMENT
$F_{NO} = 2.9$  f = 0.75  M = -0.072  W = 50  $f_B = 0.80$

| surface NO | r | d | $n_d$ | vd |
|---|---|---|---|---|
| 1 | ∞ | 0.30 | 1.88300 | 40.8 |
| 2 | 1.000 | 0.10 | 1.52010 | 50.8 |
| 3* | 0.500 | 0.55 | — | — |
| STOP | ∞ | 0.03 | — | — |
| 4 | 4.403 | 0.49 | 1.71700 | 47.9 |
| 5 | -0.849 | 0.59 | — | — |
| 6 | 5.146 | 0.29 | 1.80518 | 25.4 |
| 7 | 0.740 | 1.02 | 1.72916 | 54.7 |
| 8 | -2.486 | 0.20 | 1.52070 | 50.8 |
| 9* | -1.245 | — | — | — |

*marked surface is aspherical
NO. 3: K = -1.74470, A4 = 0.63008, A6 = 7.06571
NO. 9: K = -3.15352, A4 = 0.25161, A6 = -0.09732
The shape of the aspherical surface can be generally expressed as follows:
$x = cy^2/[1 + \{1 - (1 + K)c^2y^2\}^{1/2}] + A4y^4 + A6y^6$

TABLE 2

SECOND EMBODIMENT
$F_{NO} = 2.9$  f = 0.75  M = -0.071  W = 50  $f_B = 0.90$

| surface NO | r | d | $n_d$ | vd |
|---|---|---|---|---|
| 1 | ∞ | 0.30 | 1.88300 | 40.8 |
| 2 | -14.000 | 0.10 | 1.52010 | 50.8 |
| 3* | 0.500 | 0.84 | — | — |
| STOP | ∞ | 0.15 | — | — |
| 4 | 23.231 | 0.50 | 1.88300 | 40.8 |
| 5 | -1.061 | 0.38 | — | — |
| 6 | 23.988 | 0.29 | 1.80518 | 25.4 |
| 7 | 0.740 | 1.04 | 1.72916 | 54.7 |
| 8 | -2.878 | 0.20 | 1.52070 | 50.8 |
| 9* | -1.420 | — | — | — |

*marked surface is aspherical
NO. 3: K = -0.71376, A4 = 0.16159, A6 = 2.78510
NO. 9: K = -2.39296, A4 = 0.18428, A6 = -0.11540

TABLE 3

THIRD EMBODIMENT
$F_{NO} = 2.9$  f = 0.80  M = -0.075  W = 50  $f_B = 0.51$

| surface NO | r | d | $n_d$ | vd |
|---|---|---|---|---|
| 1 | ∞ | 0.69 | 1.88300 | 40.8 |
| 2 | 0.900 | 0.40 | 1.52010 | 50.8 |
| 3* | -1.749 | 0.12 | — | — |
| STOP | ∞ | 0.20 | — | — |
| 4 | -0.927 | 0.31 | 1.80400 | 46.6 |
| 5 | -0.554 | 0.19 | — | — |
| 6 | 3.658 | 0.30 | 1.80518 | 25.4 |
| 7 | 0.740 | 0.70 | 1.72916 | 54.7 |
| 8 | -1.659 | — | — | — |

*marked surface is aspherical
NO. 3: K = 16.69143, A4 = -0.15881, A6 = 5.10610

TABLE 4

FOURTH EMBODIMENT
$F_{NO} = 2.9$  f = 0.76  M = -0.071  W = 50  $f_B = 1.15$

| surface NO | r | d | $n_d$ | vd |
|---|---|---|---|---|
| 1 | ∞ | 0.59 | 1.88300 | 40.8 |
| 2 | 0.856 | 0.64 | — | — |
| STOP | ∞ | 0.05 | — | — |
| 3* | 2.691 | 0.53 | 1.88300 | 40.8 |
| 4 | -1.047 | 0.26 | — | — |
| 5 | -1.432 | 0.47 | 1.80518 | 25.4 |
| 6 | 0.900 | 0.80 | 1.72916 | 54.7 |
| 7 | -1.189 | 0.18 | 1.52010 | 50.8 |
| 8 | -0.766 | — | — | — |

*marked surface is aspherical
NO. 8: K = -0.83579, A4 = 0.18988, A6 = 0.03573

TABLE 5

FIFTH EMBODIMENT
$F_{NO} = 2.9$  f = 0.70  M = -0.065  W = 50  $f_B = 0.80$

| surface NO | r | d | $n_d$ | vd |
|---|---|---|---|---|
| 1 | ∞ | 0.30 | 1.88300 | 40.8 |
| 2 | 0.809 | 0.64 | — | — |
| STOP | ∞ | 0.03 | — | — |
| 3 | 4.372 | 0.62 | 1.78800 | 47.4 |
| 4 | -0.894 | 0.60 | — | — |
| 5 | -2.285 | 0.30 | 1.80518 | 25.4 |
| 6 | 0.900 | 0.80 | 1.72916 | 54.7 |
| 7 | -1.255 | 0.20 | 1.52010 | 50.8 |
| 8* | -0.656 | — | — | — |

*marked surface is aspherical
NO. 8: K = -1.04130, A4 = 0.39415, A6 = -0.10782

TABLE 6

SIXTH EMBODIMENT
$F_{NO} = 2.9\ f = 0.64\ M = -0.060\ W = 60\ f_B = 0.75$

| surface NO | r | d | $n_d$ | vd |
|---|---|---|---|---|
| 1 | ∞ | 0.30 | 1.88300 | 40.8 |
| 2 | 0.772 | 0.76 | — | — |
| STOP | ∞ | 0.03 | — | — |
| 3 | 4.078 | 0.67 | 1.88300 | 40.8 |
| 4 | -0.921 | 0.46 | — | — |
| 5 | -1.954 | 0.30 | 1.80518 | 25.4 |
| 6 | 0.720 | 0.93 | 1.72916 | 54.7 |
| 7 | -1.000 | 0.05 | 1.52010 | 50.8 |
| 8* | -0.750 | — | — | — |

*marked surface is aspherical
NO. 8: K = -2.23469, A4 = 0.11552, A6 = -0.46713 × $10^{-2}$

TABLE 7

SEVENTH EMBODIMENT
$F_{NO} = 2.9\ f = 0.76\ M = -0.071\ W = 50\ f_B = 0.94$

| surface NO | r | d | $n_d$ | vd |
|---|---|---|---|---|
| 1 | 3.234 | 0.30 | 1.88300 | 40.8 |
| 2 | 0.900 | 0.15 | 1.52010 | 50.8 |
| 3* | 0.500 | 0.52 | — | — |
| STOP | ∞ | 0.19 | — | — |
| 4 | -3198.399 | 0.48 | 1.88300 | 40.8 |
| 5 | -0.878 | 0.33 | — | — |
| 6 | -7.376 | 0.30 | 1.80518 | 25.4 |
| 7 | 0.740 | 0.99 | 1.72916 | 54.7 |
| 8 | -2.818 | 0.25 | 1.52070 | 50.8 |
| 9* | -0.950 | — | — | — |

*marked surface is aspherical
NO. 3: K = -0.03974, A4 = -0.24459, A6 = 2.83022
NO. 9: K = -2.76740, A4 = -0.02280, A6 = -0.57745 × $10^{-2}$

TABLE 8

EIGHTH EMBODIMENT
$F_{NO} = 2.9\ f = 0.74\ M = -0.069\ W = 50\ f_B = 0.77$

| surface NO | r | d | $n_d$ | vd |
|---|---|---|---|---|
| 1 | 1.139 | 0.30 | 1.88300 | 40.8 |
| 2 | 0.621 | 0.15 | 1.52010 | 50.8 |
| 3* | 0.390 | 0.74 | — | — |
| STOP | ∞ | 0.03 | — | — |
| 4 | -4.499 | 0.82 | 1.88300 | 40.8 |
| 5 | -0.863 | 0.22 | — | — |
| 6 | 4.428 | 0.31 | 1.80518 | 25.4 |
| 7 | 0.679 | 1.05 | 1.72916 | 54.7 |
| 8 | -2.461 | — | — | — |

*marked surface is aspherical
NO. 3: K = -0.31514, A4 = -0.15945, A6 = 2.51091

TABLE 9

NINTH EMBODIMENT
$F_{NO} = 2.9\ f = 0.66\ M = -0.061\ W = 50\ f_B = 0.77$

| surface NO | r | d | $n_d$ | vd |
|---|---|---|---|---|
| 1 | 1.800 | 0.30 | 1.88300 | 40.8 |
| 2 | 0.600 | 0.86 | — | — |
| STOP | ∞ | 0.03 | — | — |
| 3 | -8.688 | 0.53 | 1.78800 | 47.4 |
| 4 | -0.736 | 0.48 | — | — |
| 5 | -1.959 | 0.30 | 1.80518 | 25.4 |
| 6 | 0.900 | 0.80 | 1.72916 | 54.7 |
| 7 | -0.939 | 0.20 | 1.52010 | 50.8 |
| 8* | -0.674 | — | — | — |

*marked surface is aspherical
NO. 8: K = -1.40396, A4 = 0.27823, A6 = -0.15351

TABLE 10

TENTH EMBODIMENT
$F_{NO} = 2.9\ f = 0.76\ M = -0.072\ W = 50\ f_B = 0.50$

| surface NO | r | d | $n_d$ | vd |
|---|---|---|---|---|
| 1 | 1.400 | 0.56 | 1.88300 | 40.8 |
| 2 | 0.357 | 0.24 | — | — |
| STOP | ∞ | 0.03 | — | — |
| 3 | 2.177 | 0.60 | 1.88300 | 40.8 |
| 4 | -0.550 | 0.15 | 1.52010 | 50.8 |
| 5* | -0.435 | 0.06 | — | — |
| 6 | -1.587 | 0.30 | 1.80518 | 25.4 |
| 7 | 0.620 | 1.00 | 1.72916 | 54.7 |
| 8 | -1.329 | — | — | — |

*marked surface is aspherical
NO. 5: K = -1.43936, A4 = -0.45077, A6 = 2.64232

TABLE 11

ELEVENTH EMBODIMENT
$F_{NO} = 2.9\ f = 0.57\ M = -0.053\ W = 60\ f_B = 0.71$

| surface NO | r | d | $n_d$ | vd |
|---|---|---|---|---|
| 1 | 3.412 | 0.30 | 1.88300 | 40.8 |
| 2 | 0.646 | 1.06 | — | — |
| STOP | ∞ | 0.03 | — | — |
| 3 | 1.806 | 0.57 | 1.88300 | 40.8 |
| 4 | -0.843 | 0.24 | — | — |
| 5 | -0.826 | 0.30 | 1.80518 | 25.4 |
| 6 | 0.641 | 0.90 | 1.72916 | 54.7 |
| 7 | -1.000 | 0.10 | 1.52010 | 50.8 |
| 8* | -0.600 | — | — | — |

*marked surface is aspherical
NO. 8: K = -1.74863, A4 = 0.12393, A6 = -0.08045

TABLE 12

TWELFTH EMBODIMENT
$F_{NO} = 2.9\ f = 0.89\ M = -0.085\ W = 50\ f_B = 0.79$

| surface NO | r | d | $N_d$ | vd |
|---|---|---|---|---|
| 1 | ∞ | 0.30 | 1.88300 | 40.8 |
| 2 | -6.247 | 0.12 | 1.52010 | 50.8 |
| 3* | -4.825 | 0.10 | — | — |
| 4 | -3.440 | 0.31 | 1.88300 | 40.8 |
| 5 | 0.973 | 0.10 | — | — |
| STOP | ∞ | 0.09 | — | — |
| 6 | -16.967 | 0.86 | 1.80400 | 46.6 |
| 7 | -0.801 | 0.14 | — | — |
| 8 | 3.366 | 0.33 | 1.80518 | 25.4 |
| 9 | 0.750 | 1.17 | 1.72916 | 54.7 |
| 10 | -2.379 | — | — | — |

*marked surface is aspherical
NO. 3: K = -0.25257 × $10^{-2}$, A4 = 0.83352 × $10^{-2}$, A6 = -0.01406

TABLE 13

THIRTEENTH EMBODIMENT
$F_{NO} = 2.9$  $f = 0.90$  $M = -0.086$  $W = 50$  $f_B = 0.73$

| surface NO | r | d | $N_d$ | vd |
|---|---|---|---|---|
| 1 | ∞ | 0.44 | 1.88300 | 40.8 |
| 2 | -5.778 | 0.09 | — | — |
| 3 | -3.978 | 0.35 | 1.88300 | 40.8 |
| 4 | 0.993 | 0.08 | — | — |
| STOP | ∞ | 0.09 | — | — |
| 5 | -19.567 | 0.89 | 1.80400 | 46.6 |
| 6 | -0.825 | 0.16 | — | — |
| 7 | 2.840 | 0.33 | 1.80518 | 25.4 |
| 8 | 0.780 | 1.01 | 1.72916 | 54.7 |
| 9 | -60.912 | 0.16 | 1.52010 | 50.8 |
| 10* | -2.067 | — | — | — |

*marked surface is aspherical
NO. 10: $K = -0.01031$, $A4 = 0.67813 \times 10^{-2}$, $A6 = -0.02074$

TABLE 14

FOURTEENTH EMBODIMENT
$F_{NO} = 5.6$  $f = 1.26$  $M = -0.237$  $W = 50$  $f_B = 0.00$

| surface NO | r | d | $N_d$ | vd |
|---|---|---|---|---|
| 1 | ∞ | 0.30 | 1.88300 | 40.8 |
| 2 | -1.663 | 0.10 | 1.52010 | 50.8 |
| 3* | 0.662 | 0.10 | — | — |
| STOP | ∞ | 0.06 | — | — |
| 4 | -4.340 | 0.38 | 1.69680 | 55.5 |
| 5 | -0.500 | 0.05 | — | — |
| 6 | 14.165 | 0.30 | 1.76182 | 26.5 |
| 7 | 0.965 | 0.72 | 1.65160 | 58.5 |
| 8 | 2.563 | 0.40 | — | — |
| 9 | ∞ | 0.60 | 1.53000 | 50.0 |
| 10 | ∞ | 0.40 | 1.54000 | 40.0 |
| 11 | ∞ | — | — | — |

*marked surface is aspherical
NO. 3: $K = 2.0554$, $A4 = -0.41547$, $A6 = 0.67062 \times 10^2$

TABLE 15

FIFTEENTH EMBODIMENT
$F_{NO} = 5.6$  $f = 1.28$  $M = -0.229$  $W = 50$  $f_B = 0.00$

| surface NO | r | d | $N_d$ | vd |
|---|---|---|---|---|
| 1 | ∞ | 0.30 | 1.88300 | 40.8 |
| 2 | 3.000 | 0.10 | — | — |
| 3 | 2.974 | 0.30 | 1.88300 | 40.8 |
| 4 | -1.569 | 0.10 | 1.52010 | 50.8 |
| 5* | 0.644 | 0.10 | — | — |
| STOP | ∞ | 0.06 | — | — |
| 6 | -3.949 | 0.37 | 1.69680 | 55.5 |
| 7 | -0.500 | 0.05 | — | — |
| 8 | 16.308 | 0.30 | 1.79182 | 26.5 |
| 9 | 0.914 | 0.72 | 1.65160 | 58.5 |
| 10 | 2.658 | 0.44 | — | — |
| 11 | ∞ | 0.60 | 1.53000 | 50.0 |
| 12 | ∞ | 0.40 | 1.54000 | 40.0 |
| 13 | ∞ | — | — | — |

*marked surface is aspherical
NO. 5: $K = 1.5589$, $A4 = -0.48804$, $A6 = 0.77204 \times 10^2$

TABLE 16

SIXTEENTH EMBODIMENT
$F_{NO} = 5.6$  $f = 1.26$  $M = -0.222$  $W = 50$  $f_B = 0.00$

| surface NO | r | d | $N_d$ | vd |
|---|---|---|---|---|
| 1 | ∞ | 0.35 | 1.88300 | 40.8 |
| 2 | -2.848 | 0.05 | 1.52010 | 50.8 |
| 3* | 3.139 | 0.15 | — | — |
| 4 | 1.514 | 0.30 | 1.88300 | 40.8 |
| 5 | 0.710 | 0.07 | — | — |
| STOP | ∞ | 0.06 | — | — |
| 6 | -2.683 | 0.48 | 1.69680 | 55.5 |
| 7 | -0.500 | 0.05 | — | — |
| 8 | 4.572 | 0.30 | 1.76182 | 26.5 |
| 9 | 1.029 | 0.72 | 1.65160 | 58.5 |
| 10 | 2.286 | 0.37 | — | — |
| 11 | ∞ | 0.60 | 1.53000 | 50.0 |
| 12 | ∞ | 0.40 | 1.54000 | 40.0 |
| 13 | ∞ | — | — | — |

*marked surface is aspherical
NO. 3: $K = -0.19664$, $A4 = -0.10294$, $A6 = 0.50143$

TABLE 17

SEVENTEENTH EMBODIMENT
$F_{NO} = 5.6$  $f = 1.27$  $M = -0.225$  $W = 50$  $f_B = 0.00$

| surface NO | r | d | $N_d$ | vd |
|---|---|---|---|---|
| 1 | ∞ | 0.31 | 1.88300 | 40.8 |
| 2 | -14.800 | 0.10 | — | — |
| 3 | 4.233 | 0.30 | 1.88300 | 40.8 |
| 4 | 4.988 | 0.08 | 1.52010 | 50.8 |
| 5* | 0.603 | 0.13 | — | — |
| STOP | ∞ | 0.06 | — | — |
| 6 | -3.445 | 0.39 | 1.69680 | 55.5 |
| 7 | -0.500 | 0.05 | — | — |
| 8 | 6.473 | 0.30 | 1.76182 | 26.5 |
| 9 | 0.883 | 0.72 | 1.65160 | 58.5 |
| 10 | 2.844 | 0.43 | — | — |
| 11 | ∞ | 0.60 | 1.53000 | 50.0 |
| 12 | ∞ | 0.40 | 1.54000 | 40.0 |
| 13 | ∞ | — | — | — |

*marked surface is aspherical
NO. 5: $K = 1.4580$, $A4 = -0.54366$, $A6 = 0.33280 \times 10^2$

TABLE 18

EIGHTEENTH EMBODIMENT
$F_{NO} = 5.6$  $f = 1.15$  $M = -0.211$  $W = 50$  $f_B = 0.00$

| surface NO | r | d | $N_d$ | vd |
|---|---|---|---|---|
| 1 | 2.222 | 0.30 | 1.88300 | 40.8 |
| 2 | 0.545 | 0.10 | 1.52010 | 50.8 |
| 3* | 1.217 | 0.06 | — | — |
| STOP | ∞ | 0.05 | — | — |
| 4 | -2.732 | 0.53 | 1.69680 | 55.5 |
| 5 | -0.500 | 0.05 | — | — |
| 6 | 2.414 | 0.30 | 1.76182 | 26.5 |
| 7 | 0.736 | 0.59 | 1.65160 | 58.5 |
| 8 | 1.392 | 0.30 | — | — |
| 9 | ∞ | 0.60 | 1.53000 | 50.0 |
| 10 | ∞ | 0.40 | 1.54000 | 40.0 |
| 11 | ∞ | — | — | — |

*marked surface is aspherical
NO. 3: $K = 3.0282$, $A4 = 1.3150$, $A6 = -0.27845 \times 10^2$

TABLE 19

NINETEENTH EMBODIMENT
$F_{NO} = 5.6$ $f = 1.14$ $M = -0.197$ $W = 50$ $f_B = 0.00$

| surface NO | r | d | $N_d$ | vd |
|---|---|---|---|---|
| 1 | 2.636 | 0.30 | 1.88300 | 40.8 |
| 2 | 1.038 | 0.25 | — | — |
| 3 | 3.331 | 0.36 | 1.88300 | 40.8 |
| 4 | -3.069 | 0.10 | 1.52010 | 50.8 |
| 5* | 1.150 | 0.05 | — | — |
| STOP | ∞ | 0.05 | — | — |
| 6 | -2.680 | 0.40 | 1.69680 | 55.5 |
| 7 | -0.500 | 0.05 | — | — |
| 8 | 3.754 | 0.32 | 1.76182 | 26.5 |
| 9 | 0.781 | 0.56 | 1.65160 | 58.5 |
| 10 | 1.550 | 0.35 | — | — |
| 11 | ∞ | 0.60 | 1.53000 | 50.0 |
| 12 | ∞ | 0.40 | 1.54000 | 40.0 |
| 13 | ∞ | — | — | — |

*marked surface is aspherical
NO. 5: $K = 1.5215$, $A4 = 0.38064$, $A6 = 0.52947 \times 10^2$

TABLE 20

TWENTIETH EMBODIMENT
$F_{NO} = 5.6$ $f = 1.01$ $M = -0.156$ $W = 50$ $f_B = 0.00$

| surface NO | r | d | $N_d$ | vd |
|---|---|---|---|---|
| 1 | 4.868 | 0.35 | 1.88300 | 40.8 |
| 2 | 1.862 | 0.20 | 1.52010 | 50.8 |
| 3* | 1.950 | 0.34 | — | — |
| 4 | -35.496 | 0.36 | 1.88300 | 40.8 |
| 5 | 104.922 | 0.38 | — | — |
| STOP | ∞ | 0.05 | — | — |
| 6 | -0.803 | 0.43 | 1.69680 | 55.5 |
| 7 | -0.461 | 0.05 | — | — |
| 8 | 1.963 | 0.30 | 1.76182 | 26.5 |
| 9 | 0.598 | 0.50 | 1.65160 | 58.5 |
| 10 | 1.346 | 0.35 | — | — |
| 11 | ∞ | 0.60 | 1.53000 | 50.0 |
| 12 | ∞ | 0.40 | 1.54000 | 40.0 |
| 13 | ∞ | — | — | — |

*marked surface is aspherical
NO. 3: $K = -0.56293$ $A4 = -0.16915$, $A6 = 0.03255$

TABLE 21

TWENTY FIRST EMBODIMENT
$F_{NO} = 2.9$ $f = 0.31$ $M = -0.036$ $W = 50$ $f_B = 0.26$

| surface NO | r | d | $N_d$ | vd |
|---|---|---|---|---|
| 1 | 17.712 | 0.31 | 1.88300 | 40.8 |
| 2 | -8.302 | 0.13 | — | — |
| 3 | -4.534 | 0.31 | 1.88789 | 40.3 |
| 4 | 2.246 | 0.24 | — | — |
| STOP | ∞ | 0.03 | — | — |
| 5 | 0.772 | 0.55 | 1.88300 | 40.8 |
| 6 | -0.398 | 0.05 | 1.52010 | 50.8 |
| 7* | -0.250 | — | — | — |

*marked surface is aspherical
NO. 7: $K = -2.4732$, $A4 = -1.5283$, $A6 = 0.46950 \times 10^{-2}$

TABLE 22

TWENTY SECOND EMBODIMENT
$F_{NO} = 2.9$ $f = 0.32$ $M = -0.039$ $W = 50$ $f_B = 0.29$

| surface NO | r | d | $N_d$ | vd |
|---|---|---|---|---|
| 1 | 33.826 | 0.25 | 1.88300 | 40.8 |
| 2 | 11.562 | 0.07 | — | — |
| 3 | 72.072 | 0.25 | 1.88969 | 40.3 |
| 4 | 1.341 | 0.06 | — | — |
| STOP | ∞ | 0.03 | — | — |
| 5 | 0.792 | 0.60 | 1.88300 | 40.8 |
| 6 | -0.390 | 0.05 | 1.52010 | 50.8 |
| 7* | -0.250 | — | — | — |

*marked surface is aspherical
NO. 7: $K = -2.0000$, $A4 = -1.0000$, $A6 = 0.25000 \times 10^2$

TABLE 23

TWENTY THIRD EMBODIMENT
$F_{NO} = 2.9$ $f = 0.72$ $M = -0.066$ $W = 45$ $f_B = 0.54$

| surface NO | r | d | $N_d$ | vd |
|---|---|---|---|---|
| 1 | 1.736 | 0.30 | 1.88300 | 40.8 |
| 2 | 1.231 | 0.20 | — | — |
| 3 | 1.126 | 0.30 | 1.72916 | 54.7 |
| 4 | 0.356 | 0.30 | — | — |
| STOP | ∞ | 0.03 | — | — |
| 5 | 5.881 | 0.50 | 1.75500 | 52.3 |
| 6 | -0.683 | 0.26 | — | — |
| 7 | 2.772 | 0.50 | 1.92286 | 21.3 |
| 8 | 0.700 | 0.80 | 1.72916 | 54.7 |
| 9 | -1.176 | 0.15 | 1.52010 | 50.8 |
| 10* | -0.834 | — | — | — |

*marked surface is aspherical
NO. 10: $K = -0.20020$, $A4 = 0.78395$, $A6 = 0.35616$

TABLE 24

TWENTY FOURTH EMBODIMENT
$F_{NO} = 1.8$ $f = 0.32$ $M = -0.039$ $W = 55$ $f_B = 0.35$

| surface NO | r | d | $N_d$ | vd |
|---|---|---|---|---|
| 1 | ∞ | 0.50 | 1.88300 | 40.8 |
| 2 | 1.000 | 0.07 | — | — |
| STOP | ∞ | 0.03 | — | — |
| 3 | 1.177 | 0.51 | 1.88300 | 40.8 |
| 4 | -0.344 | 0.06 | 1.52010 | 50.8 |
| 5* | -0.266 | — | — | — |

*marked surface is aspherical
NO. 5: $K = -2.1333$, $A4 = -4.2127$, $A6 = 0.33076 \times 10^2$

TABLE 25

TWENTY FIFTH EMBODIMENT
$F_{NO} = 2.9$ $f = 0.48$ $M = -0.045$ $W = 60$ $f_B = 0.56$

| surface NO | r | d | $N_d$ | vd |
|---|---|---|---|---|
| 1 | 2.022 | 0.30 | 1.88300 | 40.8 |
| 2 | 0.528 | 0.28 | — | — |
| 3 | 51.637 | 0.30 | 1.88300 | 40.8 |
| 4 | 1.784 | 0.32 | — | — |
| STOP | ∞ | 0.03 | — | — |
| 5 | 3.161 | 0.37 | 1.77250 | 49.6 |
| 6 | -0.839 | 0.54 | — | — |
| 7 | 4.721 | 0.48 | 1.92286 | 21.3 |
| 8 | 0.745 | 0.79 | 1.72916 | 54.7 |
| 9 | -1.471 | 0.20 | 1.52010 | 50.8 |
| 10* | -0.499 | — | — | — |

*marked surface is aspherical
NO. 10: $K = -0.85820$, $A4 = 1.05472$, $A6 = -0.33103$

TABLE 26

TWENTY SIXTH EMBODIMENT
$F_{NO} = 3.6$  f = 0.50  M = −0.046  W = 60  $f_B$ = 0.54

| surface NO | r | d | $N_d$ | vd |
|---|---|---|---|---|
| 1 | ∞ | 0.30 | 1.88300 | 40.8 |
| 2 | 0.896 | 0.18 | — | — |
| 3 | 3.000 | 0.34 | 1.88300 | 40.8 |
| 4 | 1.065 | 0.37 | — | — |
| STOP | ∞ | 0.03 | — | — |
| 5 | 1.718 | 0.34 | 1.77250 | 49.6 |
| 6 | −1.017 | 0.66 | — | — |
| 7 | 5.342 | 0.30 | 1.92286 | 21.3 |
| 8 | 0.773 | 0.81 | 1.72916 | 54.7 |
| 9 | −0.947 | 0.15 | 1.52010 | 50.8 |
| 10* | −0.487 | — | — | — |

*marked surface is aspherical
NO. 10: K = −1.13178, A4 = 0.62990, A6 = −0.13775

TABLE 27

TWENTY SEVENTH EMBODIMENT
$F_{NO} = 1.8$  f = 0.33  M = −0.040  W = 50  $f_B$ = 0.29

| surface NO | r | d | $n_d$ | vd |
|---|---|---|---|---|
| 1 | ∞ | 0.20 | 1.88300 | 40.8 |
| 2 | ∞ | 0.16 | | |
| STOP | ∞ | 0.03 | | |
| 3 | 2.222 | 0.49 | 1.88300 | 40.8 |
| 4 | −0.389 | 0.05 | 1.52010 | 50.8 |
| 5* | −0.244 | — | — | — |

*marked surface is aspherical
NO. 5: K = −2.38716, A4 = −4.55994, A6 = 0.26567 × $10^2$, A8 = 0.00000, A10 = 0.00000, A12 = 0.00000
The shape of the aspherical surface can be generally expressed as follows:
$x = cy^2/[1 + \{1 + (1 + K)c^2y^2\}^{1/2}] + A4y^4 + A6y^6 + A8y^8 + A10y^{10} + A12y^{12}$

TABLE 28

TWENTY EIGHTH EMBODIMENT
$F_{NO} = 1.8$  f = 0.43  M = −0.054  W = 40  $f_B$ = 0.38

| surface NO | r | d | $n_d$ | vd |
|---|---|---|---|---|
| STOP | ∞ | 0.11 | | |
| 1 | 1.848 | 0.51 | 1.88300 | 40.8 |
| 2 | −0.410 | 0.05 | 1.52010 | 50.8 |
| 3* | −0.394 | — | — | — |

*marked surface is aspherical
NO. 3: K = −1.98384, A4 = −0.03256, A6 = 7.81836, A8 = 0.00000, A10 = 0.00000, A12 = 0.00000

TABLE 29

TWENTY NINTH EMBODIMENT
$F_{NO} = 1.8$  f = 0.39  M = −0.077  W = 45  $f_B$ = 0.34

| surface NO | r | d | $n_d$ | vd |
|---|---|---|---|---|
| STOP | ∞ | 0.04 | | |
| 1 | −1.121 | 0.30 | 1.51633 | 64.1 |
| 2 | −0.897 | 0.05 | — | — |
| 3 | 0.880 | 0.40 | 1.65830 | 57.3 |
| 4 | −0.510 | 0.05 | 1.52010 | 50.8 |
| 5* | −0.309 | — | — | — |

*marked surface is aspherical
NO. 5: K = −2.87113, A4 = −2.62966, A6 = 0.26542 × $10^2$, A8 = −0.32503 × $10^2$, A10 = −0.35704 × $10^3$, A12 = 0.12321 × $10^4$

TABLE 30

THIRTIETH EMBODIMENT
$F_{NO} = 4.0$  f = 0.91  M = −0.152  W = 46  $f_B$ = 1.01

| surface NO | r | d | $n_d$ | vd |
|---|---|---|---|---|
| STOP | ∞ | 0.04 | | |
| 1 | −0.540 | 0.23 | 1.88300 | 40.8 |
| 2 | −0.525 | 0.05 | — | — |
| 3 | −11.419 | 0.47 | 1.80518 | 25.4 |
| 4 | 0.910 | 0.73 | 1.72916 | 54.7 |
| 5 | −1.200 | 0.20 | 1.52010 | 50.8 |
| 6* | −0.700 | — | — | — |

*marked surface is aspherical
NO. 6: K = −2.18934, A4 = −0.29640, A6 = −0.23181, A8 = 0.00000, A10 = 0.00000 , A12 = 0.00000

TABLE 31

THIRTY FIRST EMBODIMENT
$F_{NO} = 2.9$  f = 0.89  M = −0.151  W = 50  $f_B$ = 0.802

| surface NO | r | d | $n_d$ | vd |
|---|---|---|---|---|
| STOP | ∞ | 0.04 | | |
| 1 | −1.449 | 0.51 | 1.88300 | 40.8 |
| 2 | −0.440 | 0.05 | 1.52010 | 50.8 |
| 3* | −0.589 | 0.05 | — | — |
| 4 | −1.100 | 0.30 | 1.80518 | 25.4 |
| 5 | 1.596 | 0.78 | 1.72916 | 54.7 |
| 6 | −0.920 | — | — | — |

*marked surface is aspherical
NO. 3: K = −0.83413, A4 = 0.42655, A6 = 0.41254, A8 = 0.00000, A10 = 0.00000 , A12 = 0.00000

TABLE 32

THIRTY SECOND EMBODIMENT
$F_{NO} = 5.6$  f = 1.19  M = −0.235  W = 50  $f_B$ = 0.00

| surface NO | r | d | $n_d$ | vd |
|---|---|---|---|---|
| STOP | ∞ | 0.06 | | |
| 1 | −1.774 | 0.51 | 1.88300 | 40.8 |
| 2 | −0.472 | 0.05 | 1.52010 | 50.8 |
| 3* | −0.732 | 0.16 | — | — |
| 4 | −6.062 | 0.30 | 1.80518 | 25.4 |
| 5 | 1.142 | 0.34 | 1.72916 | 54.7 |
| 6 | 2.620 | 0.30 | — | — |
| 7 | ∞ | 0.60 | 1.53000 | 50.0 |
| 8 | ∞ | 0.40 | 1.54000 | 40.0 |
| 9 | ∞ | — | — | — |

*marked surface is aspherical
NO. 3: K = −0.74470, A4 = −0.20247, A6 = −0.26087, A8 = 0.00000, A10 = 0.00000 , A12 = 0.00000

Figure 53:
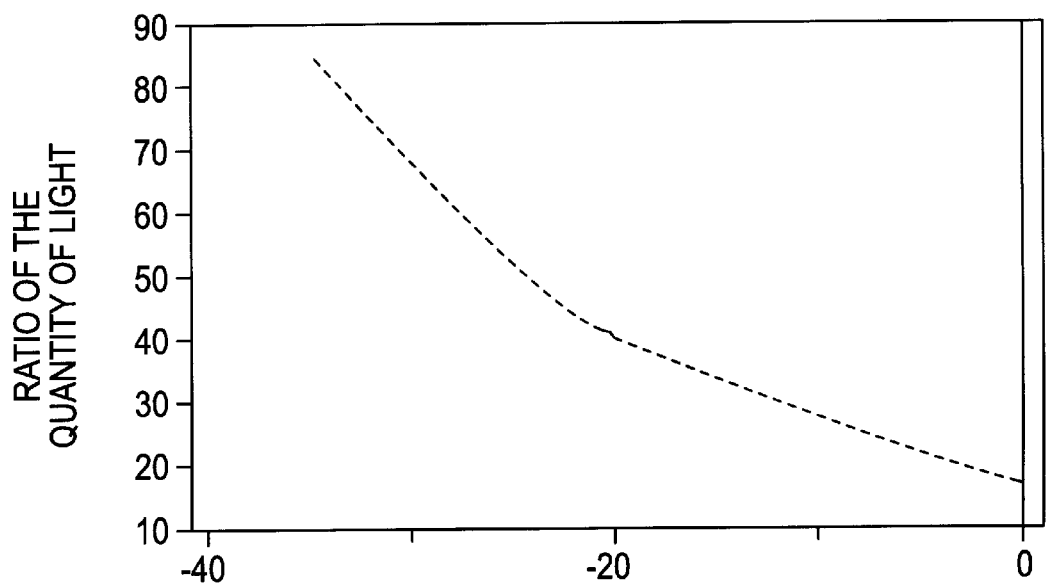
FIG. 53 is a graph showing a relation between distortions and the quantity of light of an objective lens for an endoscope.

The distortion in the 1st–11th, 25th and 26th embodiments is around −25% to −8%, and the distortion in the 12th–19th, 21st, 22nd, and 24th embodiments, is around −34% to −14%. If this distortion is corrected to be almost 0%, the quantity of light at the peripheral portion of the lens is reduced. FIG. 53, shows a relationship between the distortion and the ratio (%) of the quantity of light (ratio of the quantity of paraxial light to the quantity of light at the peripheral portion) when the angle of view is 100°. It can be seen from FIG. 53 that, even at the same angle of view, if the distortion is reduced, the quantity ratio is reduced so that the peripheral portion becomes dark. Therefore, in the embodiments mentioned above, the distortion remains to prevent the quantity of light at the peripheral portion from decreasing.

However, in the 20th and 23rd embodiments, the distortion is almost 0%, but nevertheless, the quantity of light at the peripheral portion is about 30%. Namely, there is a sufficient quantity of light at the peripheral portion. This effect is achieved by the fact that, in the 20th embodiment in which the lens has a wide angle of view, the first lens has a large negative power, so that the aperture efficiency at the peripheral portion is improved owing to the aspherical terminal surface; and in the 23rd embodiment, the lens surfaces of the first lens group I are concentric with respect to the aperture stop 233S, and hence, the aperture efficiency is improved.

It can be also seen that in the 27th and 28th embodiments, astigmatism, curvature of the field, and distortion are effectively compensated, in comparison with a lens having no aspherical surface.

In the 29th embodiment, the rear lens group II is split into the first lens 291 and the second lens 292, so that the radius of curvature r of each of the first and second lenses can be increased in comparison with the 1st and 2nd embodiments. Thus, not only can the lens be more easily produced, but also spherical aberrations can be reduced. Moreover, a comparison with a corresponding lens having no aspherical surface, distortion can be reduced from −27% to −19%.

In the 30th and 31st embodiments, the lenses 302 and 313 of the rear lens group II on the object side are cemented to the lenses 303 and 314 thereof on the image side, respectively, and hence, chromatic aberrations can be reduced.

Moreover, since the surfaces of the transparent layers 304 and 312 that are not adhered to the glass lenses are aspherical surfaces, distortion can be reduced in the 30th embodiment and astigmatism can be reduced in the 31st embodiment, respectively.

In the 32nd embodiment (FIGS. 64 and 65) which is applied to an objective lens for an electronic endoscope, an image pickup device such as a CCD (not shown) is closely connected to the adhesive layer 326 located furthest from the object. In the 32nd embodiment in which the image height is greater than, for example, that of the 31st embodiment at the same angle of view, the focal length becomes longer than that in the 31st embodiment, if the lens arrangement is identical. This results in an increase in the overall length of the lens. To prevent this, the lens group furthest from the object has a negative power, and thus, the overall length of the lens can be reduced. The length of the lens is reduced by about 20% in comparison with the 31st embodiment. Furthermore, the distortion can be reduced.

As can be understood from the above discussion, according to the present invention, since the transparent resin layer is formed on the surface of the glass lens and the surface of the transparent resin layer is an aspherical surface, an objective lens for an endoscope having an appropriate distortion can be obtained.

Moreover, since the surfaces of the glass lens can be aspherical surfaces in the present invention, not only can the glass lens be easily produced, but also the glass to be used is not limited to a specific material. Consequently, according to the present invention, even a glass material of which it is difficult to produce an aspherical surface by the molding process can be used, thus increasing the degree of freedom of design and production process.

What is claimed is:

1. An objective lens for an endoscope comprising:
    a front lens group of negative power;
    an aperture stop; and,
    a rear lens group of positive power in this order from the object side;
    wherein at least one lens of one of said front lens group or rear lens group is a compound aspherical lens comprising a glass lens and a transparent resin layer applied to a surface of said glass lens, a surface of said transparent resin layer farthest from said glass lens being an aspherical surface, and a refractive index n of said glass lens to which said transparent resin layer is applied being more than 1.65 (n>1.65)
    wherein a thickness of said glass lens on which said transparent resin layer is formed is larger on an optical axis of said objective lens than a thickness of said transparent resin layer.

2. An objective lens for an endoscope according to claim 1, wherein said front lens group is comprised of said compound aspherical lens.

3. An objective lens for an endoscope according to claim 1, wherein said front lens group is comprised of a first lens group having negative power, and said rear lens group is comprised of a second lens group having positive power and a third lens group having positive power.

4. An objective lens for an endoscope according to claim 1, wherein said rear lens group is comprised of said compound aspherical lens.

5. An objective lens for an endoscope according to claim 1, wherein said front lens group is comprised of a first lens group having negative power, and said rear lens group is comprised of a second lens group having positive power and a third lens group having negative power.

6. An objective lens of an endoscope comprising:
    a front lens group of negative power;
    an aperture stop; and,
    a rear lens group of positive power in this order from the object side;
    wherein at least one lens of said each of said front and rear lens groups is a compound aspherical lens group is a compound aspherical lens comprising a glass lens and a transparent resin layer applied to a surface of said glass lens, a surface of said transparent resin layer farthest from said glass lens being an aspherical surface, and a refractive index n of said glass lens to which said transparent resin layer is applied being more than 1.65 (n>1.65);
    wherein a thickness of said glass lens on which said transparent resin layer is formed is larger on an optical axis of said objective lens than a thickness of said transparent resin layer.

7. An objective lens for an endoscope according to claim 6, wherein said front lens group is comprised of a first lens group having negative power, and said rear lens group is comprised of a second lens group having positive power and a third lens group having positive power.

8. An objective lens of an endoscope comprising:
    a glass cover;
    an aperture stop; and,
    a rear lens group of positive power in this order from the object side;
    wherein at least one lens of said rear lens group is a compound aspherical lens comprising a glass lens and a transparent resin layer applied to a surface of said glass lens, a surface of said transparent resin layer farthest from said glass lens being an aspherical surface, and a refractive index n of said glass lens of said compound aspherical lens being more than 1.65 (n>1.65);
    wherein a thickness of said glass lens on which said transparent resin layer is formed is larger on an optical axis of said objective lens than a thickness of said transparent resin layer.

9. An objective lens for an endoscope according to claim 8, wherein said rear lens group is made of a single compound aspherical lens.

10. An objective lens of an endoscope comprising:

an aperture stop; and a rear lens group of positive power in this order from the object side;

wherein at least one lens of said rear lens group is a compound aspherical lens comprising a glass lens and a transparent resin layer applied to a surface of said glass lens, a surface of said transparent resin layer farthest from said glass lens being an aspherical surface, and a refractive index n of said glass lens of said compound aspherical lens being more than 1.65 (n>1.65);

wherein a thickness of said glass lens on which said transparent resin layer is formed is larger on an optical axis of said objective lens than a thickness of said transparent resin layer.

11. An objective lens for an endoscope according to claim 10, wherein said rear lens group is made of a single compound aspherical lens.

12. An objective lens for an endoscope according to claim 10, wherein said rear lens group is comprised of a first lens group having positive power and a second lens group having positive power, at least one of said first and second lens groups being provided with said compound aspherical lens.

13. An objective lens for an endoscope according to claim 10, wherein said rear lens group is comprised of a first lens group having positive power and a second lens group having negative power, at least one of said first and second lens groups being provided with said compound aspherical lens.

14. An objective lens for an endoscope according to claim 12, wherein said first lens group is constituted by said compound aspherical lens.

15. The objective lens for an endoscope according to claim 1, wherein a radius of curvature of said surface of said glass lens on which said transparent resin layer is formed, and a paraxial curvature of an aspherical surface of said transparent resin layer, have the same sign.

16. The objective lens for an endoscope according to claim 1, wherein said transparent resin layer is formed by pressing a transparent synthetic resin material.

17. The objective lens for an endoscope according to claim 6, wherein a radius of curvature of said surface of said glass lens on which said transparent resin layer is formed, and a paraxial curvature of an aspherical surface of said transparent resin layer, have the same sign.

18. The objective lens for an endoscope according to claim 6, wherein said transparent resin layer is formed by pressing a transparent synthetic resin material.

19. The objective lens for an endoscope according to claim 8, wherein a radius of curvature of said surface of said glass lens on which said transparent resin layer is formed, and a paraxial curvature of an aspherical surface of said transparent resin layer, have the same sign.

20. The objective lens for an endoscope according to claim 8, wherein said transparent resin layer is formed by pressing a transparent synthetic resin material.

21. The objective lens for an endoscope according to claim 10, wherein a radius of curvature of said surface of said glass lens on which said transparent resin layer is formed, and a paraxial curvature of an aspherical surface of said transparent resin layer, have the same sign.

22. The objective lens for an endoscope according to claim 10, wherein said transparent resin layer is formed by pressing a transparent synthetic resin material.

* * * * *